(12) United States Patent
Barnes et al.

(10) Patent No.: US 12,313,480 B2
(45) Date of Patent: May 27, 2025

(54) PRISM COUPLING SYSTEMS AND METHODS EMPLOYING LIGHT-BLOCKING MEMBERS

(71) Applicant: CORNING INCORPORATED, Corning, NY (US)

(72) Inventors: Craig Llewellyn Barnes, North Cohocton, NY (US); Vitor Marino Schneider, Painted Post, NY (US); Nathaniel David Wetmore, Corning, NY (US)

(73) Assignee: CORNING INCORPORATED, Corning, NY (US)

(*) Notice: Subject to any disclaimer, the term of this patent is extended or adjusted under 35 U.S.C. 154(b) by 366 days.

(21) Appl. No.: 17/839,822

(22) Filed: Jun. 14, 2022

(65) Prior Publication Data

US 2022/0404220 A1    Dec. 22, 2022

Related U.S. Application Data

(60) Provisional application No. 63/212,246, filed on Jun. 18, 2021.

(51) Int. Cl.
*G01L 1/24* (2006.01)
*G02B 7/18* (2021.01)
(Continued)

(52) U.S. Cl.
CPC .............. *G01L 1/24* (2013.01); *G02B 7/1805* (2013.01); *H04N 23/55* (2023.01); *H04N 23/56* (2023.01); *G02B 27/56* (2013.01)

(58) Field of Classification Search
CPC ......... G01L 1/24; G01L 5/047; G02B 7/1805; G02B 27/56; H04N 23/55; H04N 23/56
See application file for complete search history.

(56) References Cited

U.S. PATENT DOCUMENTS

| | | | |
|---|---|---|---|
| 8,957,374 B2* | 2/2015 | Liu | G01N 21/23 |
| | | | 250/338.1 |
| 9,109,881 B2* | 8/2015 | Roussev | G01N 21/41 |
| | (Continued) | | |

FOREIGN PATENT DOCUMENTS

WO   2021/085341 A1   5/2021

OTHER PUBLICATIONS

International Search Report and Written Opinion of the International Searching Authority; PCT/US22/33910; dated Sep. 29, 2022; 9 pages; Commissioner for Patents.

*Primary Examiner* — Michael P LaPage
(74) *Attorney, Agent, or Firm* — Payal Patel

(57) ABSTRACT

A prism coupling system configured to determine at least one stress characteristic in a chemically strengthened substrate having a surface and a near-surface waveguide has a a light source system that generates measurement light. A coupling prism provides optical coupling of the measurement light into and out of the near-surface waveguide over an optical path that comprises a low-angle region and a high-angle region. A detector system arranged to receive the measurement light from the coupling prism to detect a mode spectrum image. A light-blocking member is operably disposed to at least partially extend into the low-angle region without extending into the high-angle region to increase or optimize the contrast of the mode spectrum image.

12 Claims, 19 Drawing Sheets

(51) Int. Cl.
*H04N 23/55* (2023.01)
*H04N 23/56* (2023.01)
*G02B 27/56* (2006.01)

(56) References Cited

U.S. PATENT DOCUMENTS

| | | |
|---|---|---|
| 9,140,543 B1 | 9/2015 | Allan et al. |
| 9,442,028 B2 | 9/2016 | Roussev et al. |
| 9,696,207 B2 | 7/2017 | Roussev et al. |
| 9,983,064 B2 | 5/2018 | Roussev et al. |
| 2014/0092377 A1 | 4/2014 | Liu et al. |
| 2014/0368808 A1* | 12/2014 | Roussev ............... G01N 21/41 356/32 |
| 2015/0066393 A1 | 3/2015 | Liu et al. |
| 2015/0308897 A1 | 10/2015 | Roussev et al. |
| 2015/0308908 A1* | 10/2015 | Roussev ............... G01L 1/241 356/135 |
| 2015/0338308 A1* | 11/2015 | Li ............... G01J 4/04 356/73.1 |
| 2016/0178477 A1 | 6/2016 | Roussev et al. |
| 2018/0252586 A1* | 9/2018 | Roussev ............... G01N 21/23 |
| 2019/0234875 A1* | 8/2019 | Yasuura ............... G01N 21/47 |
| 2021/0048649 A1* | 2/2021 | Goldenberg ....... G02B 13/0065 |
| 2022/0276106 A1* | 9/2022 | Andrews ............... G02B 5/04 |
| 2024/0300856 A1* | 9/2024 | Roussev ............... C03C 21/002 |

\* cited by examiner

PRISM COUPLING SYSTEMS AND METHODS EMPLOYING LIGHT-BLOCKING MEMBERS

This application claims the benefit of priority of U.S. Provisional Application Ser. No. 63/212,246 filed on Jun. 18, 2021, the content of which is relied upon and incorporated herein by reference in its entirety.

FIELD

The present disclosure relates to prism coupling systems for measuring stress in parts, and in particular relates to prism-coupling systems and methods employing light-blocking members.

BACKGROUND

Chemically strengthened glass and glass-ceramic parts have become important for a variety of applications, including resilient, shatter-resistant and scratch-resistant, touch-enabled, protective cover windows for smart phones and tablets. These glass parts and glass-ceramic parts are thinner and lighter than thermally tempered glass yet tougher due to the high surface compression achievable through an ion-exchange process.

The quick adoption, continuous improvement and dramatic market growth of such parts were boosted by the availability of quick nondestructive techniques for measuring the main stress characteristics of the parts, such as the surface compressive stress (SC) and depth of layer (DOL). Such measurements can be made on flat parts using a commercially available high-resolution evanescent prism coupling system, such as the FSM-6000LE made by Orihara Industrial Co., Ltd and sold by Luceo, both of Japan. A stress characteristic, the center tension (CT), may be inferred by invoking a force balance requirement between the compressive and tensile forces of the given part.

A prism coupling system captures a mode spectrum of transverse-electric (TE) and transverse-magnetic (TM) optical propagation modes of a near-surface waveguide defined by the ion-exchanged region. The stress characteristics are extracted from the difference between the TM and TE mode spectra by using the stress-optic coefficient (SOC). Due to the small SOC, the stress-induced birefringence (difference between TM and TE refractive index) represents a small difference between two much larger index numbers. Consequently, the magnitude and shape of the recovered stress profile are strongly affected by small errors in the recovered TE and TM mode spectra.

To minimize such errors, high-resolution capture of the TE and TM mode spectra is necessary. Unfortunately, this is not always possible with a standard configuration of commercially available evanescent prism coupling systems. This is particularly true with parts that have sharp refractive index profiles and/or that are very thin.

SUMMARY

The mode spectrum (i.e., the TE and TM mode spectra) of a part having a sharp refractive index profile or that is very thin is not properly imaged and captured using existing (conventional) evanescent prism coupling systems. For example, when one measures thin glass parts having a thickness of less than 200 microns, the mode spectrum contrast is reduced to the point where accurate characterization of stress-related properties is very difficult if not impossible.

The systems and methods disclosed herein employ one or more light-blocking members operably disposed in the prism coupling system to obtain a mode spectrum from which a sufficiently accurate characterization of a stress-related property such as compressive stress SC and depth-of-layer DOL can be obtained. The systems and methods disclosed herein thus represent a substantial improvement in prism coupling measurement technology since now a wider range of chemically strengthened glass parts can be measured and characterized. This leads to better process control which in turn results in better quality and higher yields due to the improved accuracy and precision of the measurement.

An embodiment of the disclosure is directed to a prism coupling system configured to determine at least one stress characteristic in a chemically strengthened substrate having a surface and a near-surface waveguide. The prism coupling system has a light source system that generates measurement light and a coupling prism to provide optical coupling of the measurement light into and out of the near-surface waveguide over an optical path that comprises a low-angle region and a high-angle region. A detector system is arranged to receive the measurement light from the coupling prism to detect a mode spectrum image. A light-blocking member operably disposed to at least partially extend into the low-angle region without extending into the high-angle region.

Another embodiment of the disclosure is directed to a prism coupling assembly for a prism coupling system used to measure at least one stress characteristic of a chemically strengthened substrate having a near-surface waveguide. The prism coupling assembly comprise: a coupling prism to provide optical coupling of measurement light into and out of the near-surface waveguide over an optical path that comprises a low-angle region and a high-angle region; and a light-blocking member operably arranged relative to the coupling prism to extend at least partially into the low-angle region and without extending into the high-angle region.

Another embodiment of the disclosure is directed to a method of determining at least one stress characteristic of a chemically strengthened substrate having a near-surface waveguide, comprising: digitally capturing a mode spectrum image of the chemically strengthened substrate using light that travels over an optical path having a low-angle region and a high-angle region; and blocking at least a portion of light traveling in the low-angle region without substantially blocking the light traveling in the high-angle region.

The various systems, assemblies and methods disclosed herein are particularly useful for chemically strengthened substrates having a steep refractive index profile and/or that are very thin. The discussion below includes instructions on how to select an appropriate light-blocking member or combination of such members to improve or optimize the contrast of the mode spectrum image as compared to when a light-blocking member is not used.

According to aspect (1), a prism coupling system configured to determine at least one stress characteristic in a chemically strengthened substrate having a surface and a near-surface waveguide is provided. The prism coupling system comprising: a light source system that generates measurement light; a coupling prism to provide optical coupling of the measurement light into and out of the near-surface waveguide over an optical path that comprises a low-angle region and a high-angle region; a detector system arranged to receive the measurement light from the coupling prism to detect a mode spectrum image; and a light-blocking member operably disposed to at least partially extend into the low-angle region without extending into the high-angle region.

According to aspect (2), the prism coupling system according to aspect (1) is provided, further comprising a second light-blocking member disposed in a second low-angle region.

According to aspect (3), the prism coupling system according to aspect (1) is provided, wherein the light-blocking member is opaque.

According to aspect (4), the prism coupling system according to aspect (1) is provided, wherein the light-blocking member is semi-opaque.

According to aspect (5), the prism coupling system according to aspect (1) is provided, wherein the light-blocking member has at least one of an adjustable height and an adjustable distance from the coupling prism.

According to aspect (6), the prism coupling system according to aspect (1) is provided, wherein the mode spectrum image has a first contrast and wherein the light-blocking member is configured so that the first contrast is at least 10% greater than a second contrast of the mode spectrum image as captured without the light-blocking member.

According to aspect (7), the prism coupling system according to aspect (1) is provided, wherein the chemically strengthened substrate has a thickness of less than 250 microns.

According to aspect (8), a prism coupling assembly for a prism coupling system used to measure at least one stress characteristic of a chemically strengthened substrate having a near-surface waveguide is provided. The prism coupling assembly comprising: a coupling prism to provide optical coupling of measurement light into and out of the near-surface waveguide over an optical path that comprises a low-angle region and a high-angle region; and a light-blocking member operably arranged relative to the coupling prism to extend at least partially into the low-angle region and without extending into the high-angle region.

According to aspect (9), the prism coupling assembly according to aspect (8) is provided, further comprising a second light-blocking member, wherein the light-blocking member at least partially resides within the optical path upstream of the coupling prism and the second light-blocking member at least partially resides within the optical path downstream of the coupling prism.

According to aspect (10), the prism coupling assembly according to aspect (8) is provided, wherein the light-blocking member has at least one of an adjustable height and an adjustable position.

According to aspect (11), the prism coupling assembly according to aspect (8) is provided, wherein the light-blocking member is opaque.

According to aspect (12), the prism coupling assembly according to aspect (8) is provided, wherein the chemically strengthened substrate has a thickness of less than 250 microns.

According to aspect (13), a method of determining at least one stress characteristic of a chemically strengthened substrate having a near-surface waveguide is provided. The method comprising: digitally capturing a mode spectrum image of the chemically strengthened substrate using light that travels over an optical path having a low-angle region and a high-angle region; and blocking at least a portion of light traveling in the low-angle region without substantially blocking the light traveling in the high-angle region.

According to aspect (14), the method according to aspect (13) is provided, wherein the digitally captured mode spectrum has a first contrast in the absence of said blocking and has a second contrast due to said blocking, and wherein the second contrast is at least 10% greater than the first contrast.

According to aspect (15), the method according to aspect (14) is provided, wherein the first contrast is insufficient for determining the at least one stress characteristic and wherein the second contrast is sufficient for determining the at least one stress characteristic.

According to aspect (16), the method according to aspect (13) is provided, wherein the at least one stress characteristic comprises at least one of a surface compressive stress and a depth of layer.

According to aspect (17), the method according to aspect (13) is provided, wherein said blocking is performed using a light-blocking member.

According to aspect (18), the method according to aspect (17) is provided, wherein the light-blocking member is operably disposed optically upstream from a coupling prism used to optically couple the measurement light into the near-surface waveguide of the chemically strengthened substrate.

According to aspect (19), the method according to aspect (18) is provided, further comprising a second light-blocking member operably disposed optically downstream from the coupling prism.

According to aspect (20), the method according to aspect (13) is provided, wherein the chemically strengthened substrate has a thickness of less than 250 microns.

Additional features and advantages are set forth in the Detailed Description that follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the Detailed Description serve to explain principles and operation of the various embodiments. As such, the disclosure will become more fully understood from the following Detailed Description, taken in conjunction with the accompanying Figures, in which.

DETAILED DESCRIPTION

Figure 1:
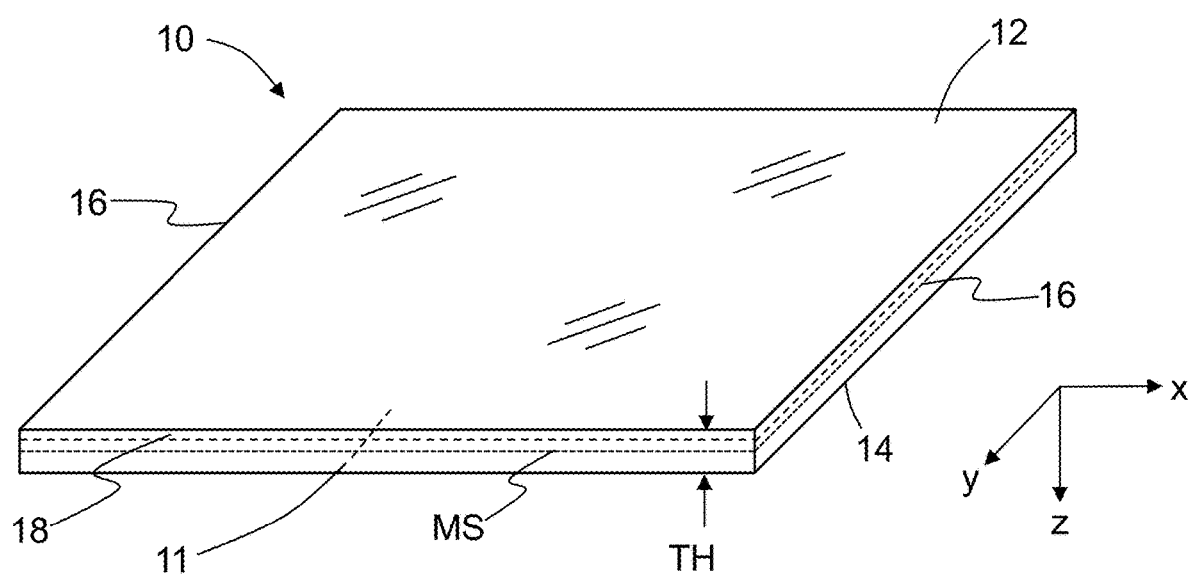
FIG. 1 is an elevated view of an example flat chemically strengthened (CS) substrate as an example type of part that can be measured using the systems and methods disclosed herein.

Reference is now made in detail to various embodiments of the disclosure, examples of which are illustrated in the accompanying drawings. Whenever possible, the same or like reference numbers and symbols are used throughout the drawings to refer to the same or like parts. The drawings are not necessarily to scale, and one skilled in the art will recognize where the drawings have been simplified to illustrate the key aspects of the disclosure.

The claims as set forth below are incorporated into and constitute part of this Detailed Description.

Cartesian coordinates are shown in some of the Figures for the sake of reference and are not intended to be limiting as to direction or orientation.

The term "substrate" is used herein to generally refer to a part, sample, component, element, member, etc., that is subject to measurement using the prism coupling systems and methods disclosed herein to obtain one or more stress-related characteristics of the substrate. It is assumed that the substrate has a near-surface waveguide that enables use of an evanescent prism coupling system to obtain and process a guided mode spectrum (or angular spectrum of effective indices) defined by the near-surface optical waveguide.

The term "CS substrate" is short for "chemically strengthened substrate" as one example of a substrate formed using a chemical strengthening process such as an ion-exchange (IOX) process.

The term "glass" includes glass-ceramics, amorphous glass and crystalline glass.

The acronym NSWG means "near-surface waveguide."

The abbreviation "um" stands for "micron" or "micrometer."

The term "lower-order modes" means the first few (e.g., 3) modes of the totality of modes supported by a NSWG. These lower-order modes have the higher effective indices $n_{eff}$ and highest propagation constants $\beta$ allowed in the waveguide. The term "higher-order mode" means any mode beyond (higher than) the lower-order modes. These higher-order modes have the lower effective indices and lower/lowest propagation constants allowed in the waveguide, in comparison to the lower-order modes.

The terms "first low-angle region" and "input low angle-region" are synonymous and mean the angular region in the prism coupling system between the plane of the CS substrate and the first axis A1.

The term "elevation angle" as used herein refers to angles that are measured relative to a line or plane parallel to the substrate (e.g., the coupling surface), as opposed to angles defined relative to a line normal to incident surface of the light, as in classical optics. In an example of a CS substrate having a curvature, the elevation angle can be defined relative to a line tangent to the CS substrate surface at the coupling location.

The terms "second low-angle region" and "output low-angle region" mean the angular region in the prism coupling system between the plane of the CS substrate surface and the second axis A2.

The term "low-angle region" can mean the first low-angle region and/or the second low-angle region.

The term "low-angle light" means light (light ray or light beam) that travels within either or both of the first and second low-angle regions. Low-angle light can include measurement light or background light.

The term "contrast" has the standard meaning of a measure of the sharpness of an image and in an example can be quantified as $C=[I_{max}-I_{min}]/[I_{max}+I_{min}]$ so that it has a range from 0 to 1.

Terms such as top, bottom, front, back, side, etc. are relative terms used for ease of discussion and are not intended to be limiting as to orientation and direction.

Chemically Strengthened (CS) Substrate

FIG. 1 is an elevated view of example chemically strengthened (CS) substrate 10. The CS substrate 10 has a body 11 that defines a first and second opposite surfaces 12 and 14, referred to as top and bottom surfaces for ease of discussion. The CS substrate 10 also has opposite edges 16 and a middle surface MS located midway between the top and bottom surfaces 12 and 14 and which is a planar surface for the example flat CS substrate.

Example types of CS substrates 10 are glass-based and are used as protective covers for displays and/or housings for mobile devices such as smart phones, tablets, laptop computers, GPS devices, etc. Such CS substrates 10 tend to be thin and planar, such as shown in FIG. 1, but can have a curvature.

In some cases, the thickness TH of the CS substrate 10 can be less than 400 um or less than 200 um or less than 100 um, and in some examples can in the range from 0.010 mm≤TH≤2 mm, such as 0.20 mm≤TH≤2 mm, 0.25 mm≤TH≤2 mm, 0.3 mm≤TH≤2 mm, or 0.3 mm≤TH≤1 mm, and any and all sub-ranges formed between these endpoints. A thin CS substrate is one that has a thickness of less than 250 microns, i.e., less than 0.25 mm.

Figure 2A:
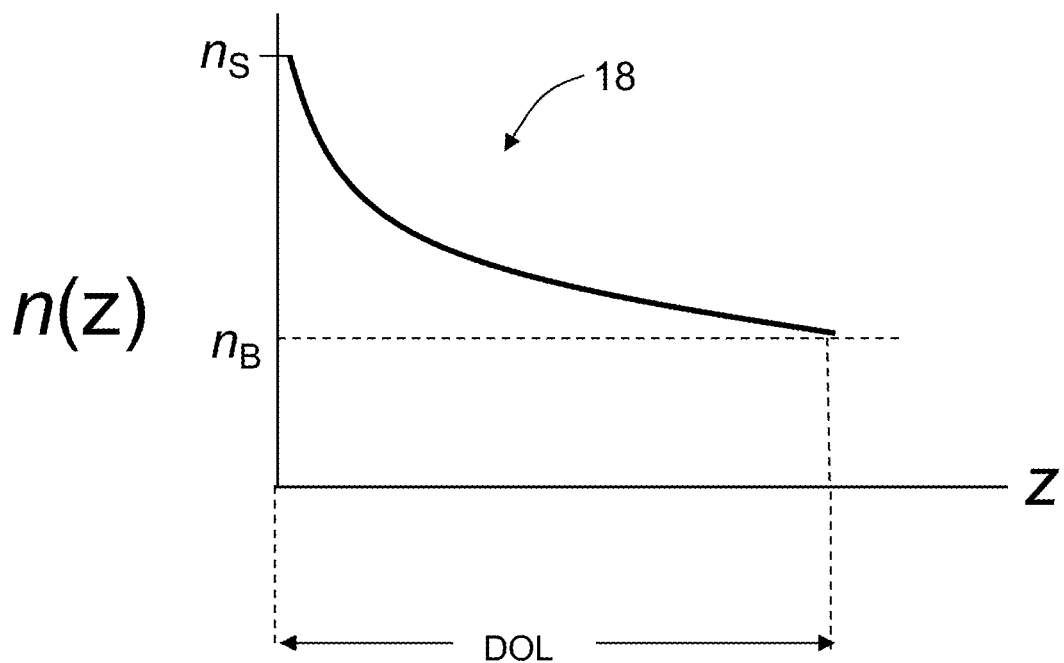
FIGS. 2A and 2B are plots of example refractive index profiles n(z) versus z (depth into the substrate) for an example CS substrate formed using an IOX process that generates a relatively sharp near-surface refractive index profile that forms a near-surface waveguide.
Figure 2B:
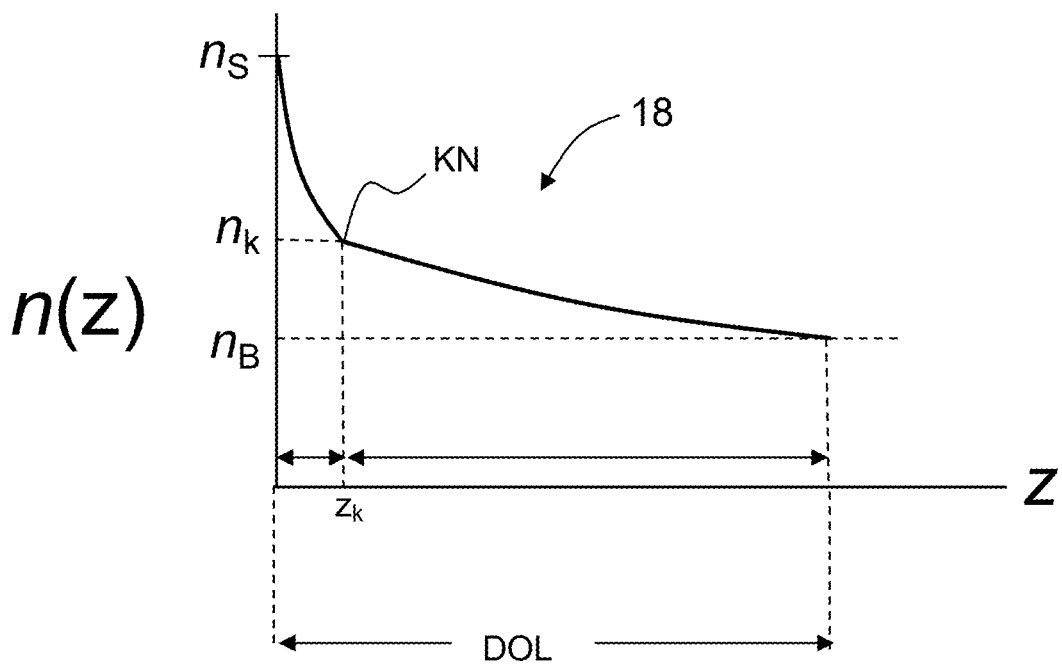

In an example, the CS substrate 10 is made of glass and has undergone an ion-exchange (IOX) process whereby at least one type of ion has been exchanged through the one or both of the top and bottom surfaces 12 and 14 and into the body 11. The IOX process forms a near-surface waveguide (NSWG) 18 (shown at the top surface 12) that has a refractive index profile n(z) that may be different for S-polarized (transverse electric, TE) light than for P-polarized (transverse magnetic, TM) light, which is polarized parallel to its plane of incidence FIGS. 2A and 2B are plots of example refractive index profiles n(z) versus z (depth into the substrate) for an example CS substrate 10 formed using two different IOX processes that generate a relatively sharp near-surface refractive index profile that forms a near-surface waveguide. The refractive index profile n(z) of FIG. 2A can be formed using a single IOX process for example and can have an error function type of profile. The surface refractive index is $n_s$ at z=0 and the bulk refractive index of the substrate is $n_B$. The depth of layer DOL is also shown. The depth of layer DOL is related to the depth of the ion exchange.

The refractive index profile n(z) of FIG. 2B can be formed using a double IOX process and has a two-part profile that includes a "knee" KN having a refractive index $n_k$ at a depth $z_k$ and is associated with a knee stress SCk.

The NSWG 18 supports select guided modes, which can be divided into lower-order modes (e.g., the first few modes) and higher-order modes (e.g., those modes above the first few modes), with the latter extending farther out from the NSWG.

The ion-exchange process that forms ion-exchanged region 18 in CS substrate 10 typically gives rise to an amount of birefringence B. This birefringence B can be used to calculate the stress (e.g., compressive stress SC) at (and near) outer surface 12, and/or the stress profile S(z), using known techniques. The stress profile S(z) is related to birefringence B via S(z)=B(z)/SOC, where SOC is the stress-optic coefficient and $B(z)=[n_{TM}(z)-n_{TE}(z)]$ where $n_{TM}(z)$ and $n_{TE}(z)$ are the transverse magnetic (TM) and transverse electric (TE) polarization components of the refractive index profile n(z).

The Evanescent Prism Coupling System

Figure 3A:
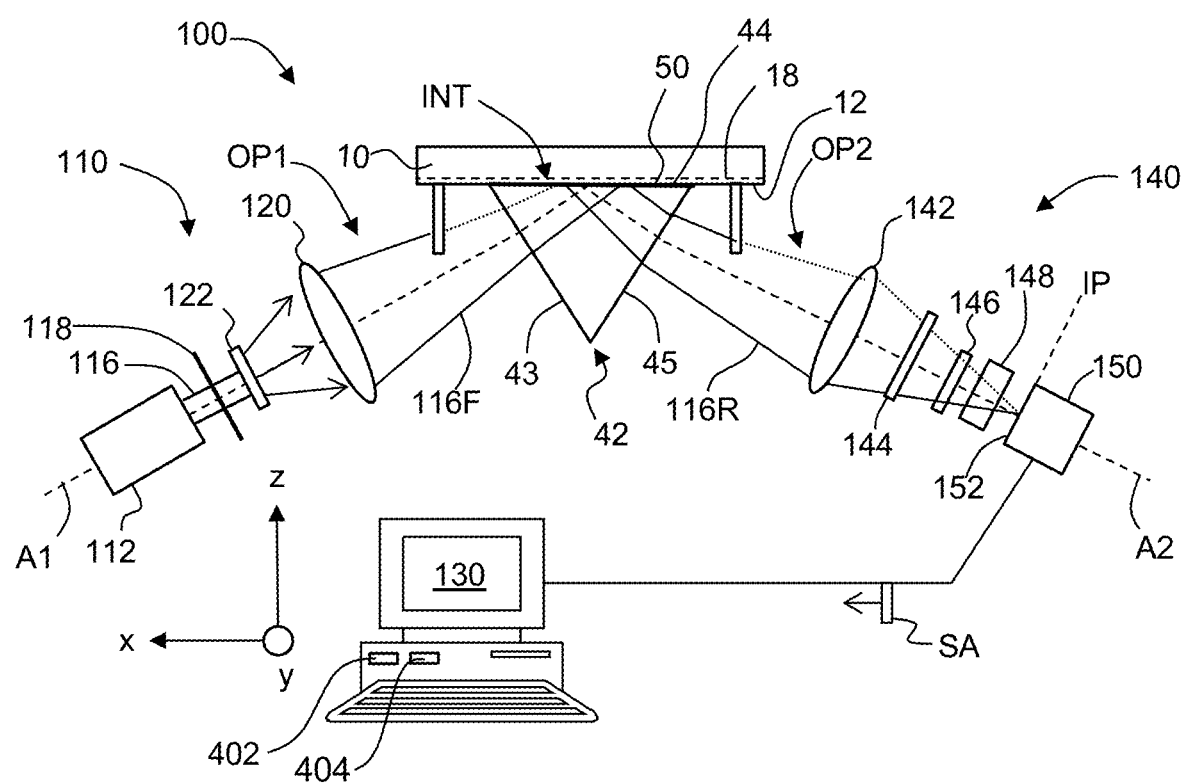
FIG. 3A is a schematic diagram of an example of the prism coupling system used to carry out the measurement methods disclosed herein for characterizing at least one stress-related property of a CS substrate.
Figure 3B:
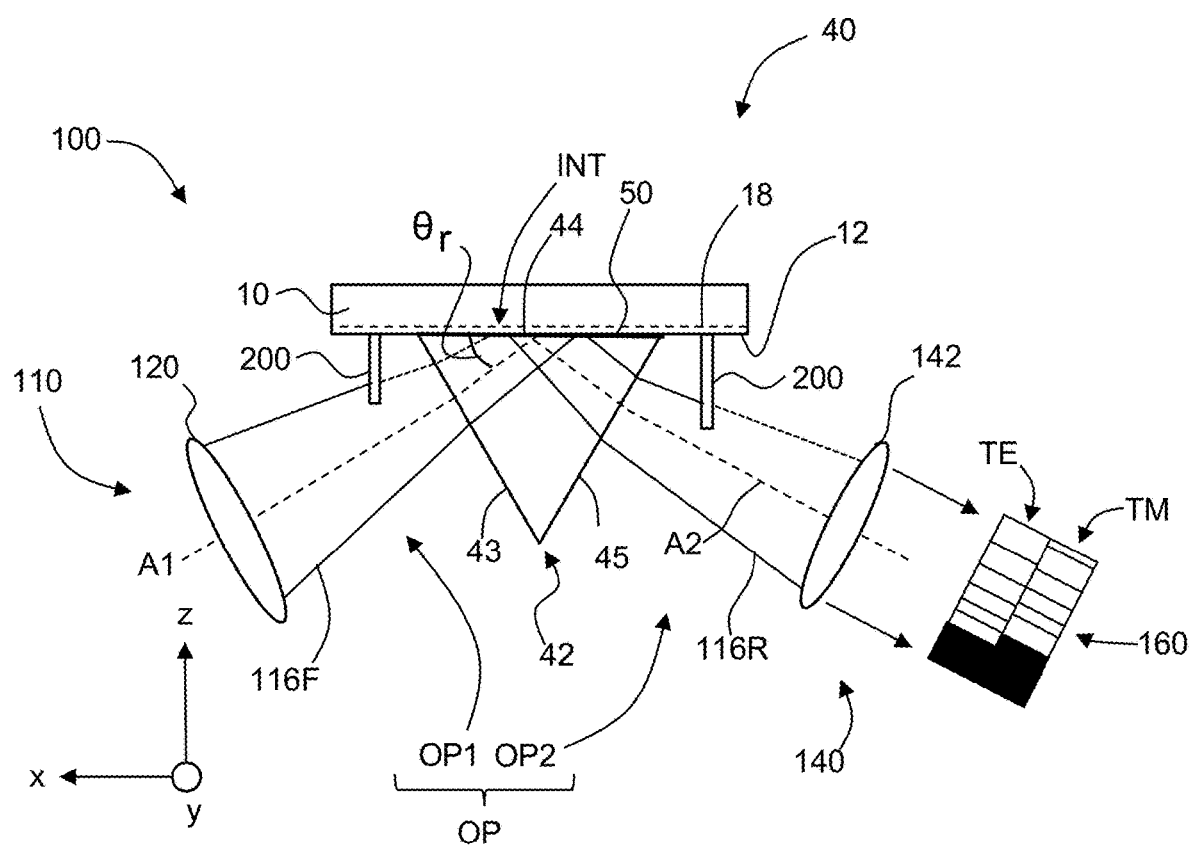
FIG. 3B is a close-up view of the prism coupling assembly of the prism coupling system of FIG. 3A.

FIG. 3A is a schematic diagram of an example evanescent prism coupling system ("system") 100 while FIG. 3B is a close-up view of the prism coupling assembly 40 of the system as described below. The enhanced evanescent prism coupling system 100 can be used to carry out the enhanced measurement methods disclosed herein. The system 100 has an enhanced or modified configuration as described below that employs one or more light-blocking members 200 that enable it to accurately measure the CS substrate 10 to obtain one or more stress characteristics such as a birefringence B, a surface compressive stress SC=S(0), a depth of layer DOL, as well as in other examples a spike depth of layer $DOL_{sp}$, a knee stress $SC_k$ for the CS substrate 10.

With reference to FIG. 3A and FIG. 3B, the system 100 includes a first system axis ("first axis") A1 along which resides a light source system 110 and also includes a second system axis ("second axis") A2 along which resides a detector system 140. The first and second axes A1 and A2 reside substantially in a common plane (e.g., x-z plane as shown).

The light source system 110 includes a light source 112 that generates a light beam 116 at a measurement wavelength $\lambda_A$, the light beam traveling along the first axis A1 and over a first optical path OP1. The system 100 includes a coupling prism 42 having an index of refraction $n_p$, an input surface 43, an output surface 45 and a coupling surface 44 that is interfaced with the top surface 12 of the CS substrate 10 to form a coupling interface INT. In an example, an index matching fluid 50 can be used between top surface 12 of the CS substrate and the coupling surface 44 to facilitate optical coupling of the measurement light into and out of the NSWG 18, as described below. The coupling prism 40 and the light-blocking members 200 constitute a coupling prism assembly.

The system 100 includes a system controller ("controller") 130, such as computer configured to carry out instructions embodied in a non-transient computer readable medium, including calculating stress-related characteristics of the CS substrate based on measured coupling spectra and/or mode spectrum parameters as described below. In an example, the controller 130 includes a processor unit ("processor") 402 and a memory unit ("memory") 404. The controller can comprise a computer and can include any one of the know reading devices used in or with computers, for example, a floppy disk drive, a CD-ROM drive, a DVD drive, a magnetic optical disk (MOD) device (not shown), solid-state drive or any other digital device including a network-connecting device, such as an Ethernet device (not shown), for reading instructions and/or data from a computer-readable medium, such as a floppy disk, a CD-ROM, a DVD, a MOD, a flash drive or another digital source such as a network or the Internet. The controller 130 is configured to execute instructions stored in firmware and/or software (not shown), including signal-processing instructions for carrying out the surface birefringence/stress measurements disclosed herein. In examples, the terms "controller" and "computer" are interchangeable.

The controller 130 is programmable to perform the functions described herein, including the operation of system 10 and the aforementioned signal processing of image signals SI to arrive at a measurement of at least one characteristic of the measured curved part, such as a surface stress, a stress profile, a compressive stress, a depth of layer, a refractive index profile, and a birefringence.

As used herein, the term "computer" is not limited to just those integrated circuits referred to in the art as computers but broadly refers to computers, processors, microcontrollers, microcomputers, programmable logic controllers, application-specific integrated circuits and other programmable circuits, and these terms are used interchangeably herein Software may implement or aid in the performance of the operations of system 10 disclosed herein, including the aforementioned signal processing. The software may be operably installed in controller 130 and in particular in processor 402 and memory 404. Software functionalities may involve programming, including executable code, and such functionalities may be used to implement the methods disclosed herein. Such software code is executable by the general-purpose computer, e.g., by the processor 402.

In operation, the code and possibly the associated data records are stored within a general-purpose computer platform, within processor 402 and/or in memory 404. At other times, however, the software may be stored at other locations and/or transported for loading into the appropriate general-purpose computer systems. The embodiments discussed herein involve one or more software products in the form of one or more modules of code carried by at least one machine-readable medium. Execution of such code by processor 402 of computer 130 enables the platform to implement the catalog and/or software downloading functions in essentially the manner performed in the embodiments discussed and illustrated herein.

The controller 130 and/or processor 402 may each employ a computer-readable medium or machine-readable medium (e.g., memory 404), which refers to any medium that participates in providing instructions to the processor for execution, including, for example, determining an amount of surface birefringence/stress or the stress profile S(x) of the CS substrate 10. The memory 404 constitutes a computer-readable medium. Such a medium may take many forms, including but not limited to non-volatile media, volatile media and transmission media. Non-volatile media include, for example, optical or magnetic disks, such as any of the storage devices in any computer(s) operating as one of the server platforms discussed above. Volatile media include dynamic memory, such as the main memory of such a computer platform. Physical transmission media include coaxial cables, copper wire and fiber optics, including the wires that comprise a bus within a computer system.

Common forms of computer-readable media therefore include, for example, a floppy disk, a flexible disk, a hard disk, magnetic tape, flash drives and any other magnetic medium; a CD-ROM, a DVD and any other optical medium; less commonly used media such as punch cards, paper tape and any other physical medium with patterns of holes; a RAM, a PROM, an EPROM, a FLASH-EPROM and any other memory chip or cartridge; and a carrier wave transporting data or instructions, cables or links transporting such a carrier wave, or any other medium from which a computer can read programming code and/or data. Many of these forms of computer-readable media may be involved in carrying one or more sequences of one or more instructions to processor 402 for execution.

The system 10 may be a version of the aforementioned commercial prism-coupling instrument, such as the FSM-6000LE prism-coupling instrument made and sold by Orihara Industrial Co., Ltd., of Tokyo, Japan, and modified as described here.

The light source system 110 also includes along the first optical axis A1: an optional polarizer 118, an optional light diffuser 122 that resides downstream of the light source 112, and an optional illumination system focusing lens 120 that resides downstream of the light diffuser. In an example, the light source 112 comprises a light-emitting diode (LED) or a laser diode.

The detector system 140 includes in order along the second system axis A2: a detector optical system 142, a band-pass filter 144 centered on the wavelength $\lambda_4$, an optional attenuator 146, a TM-TE polarizer 148 (which has side-by-side TM and TE sections, not shown) and a digital detector (e.g., a digital camera, image sensor, CCD array, etc.) 150 that has TM and TE sections (not shown) as defined by the TM-TE polarizer 148. The digital detector 150 has a detector surface 152, which in an example resides at an image plane IP of the detector optical system 142. In an example, the digital detector comprises a digital camera and so in some cases can just be called a "camera."

The light beam 116 from the light source 112 is diffused by the light diffuser 118 and is focused by the light source system focusing lens 120 to form a focused light beam 116F. The focused light beam 116F is incident upon the coupling prism 42 at the input surface 43 and travels to the coupling interface INT where a portion of the focused light beam is optically coupled into the substrate and/or the NSWG 18 and travels within the substrate and/or NSWG while a portion of the focused light beam is reflected from the coupling interface and forms a reflected light beam 116R. The reflected light beam exits the output surface 45 of the coupling prism 42 and travels along the second system axis A2 to the detector system 140 over a second optical path OP2. The reflected light beam 116R includes information about (i.e., embodies) the angular reflectance spectrum and/or the mode spectrum of the guided modes of the NSWG 18. The reflected light beam 116R is focused by the detector optical system 142 to form an image of the angular reflectance spectrum and the mode spectrum of the guided light at the digital detector 150.

The first and second optical paths OP1 and OP2 define an overall system optical path or just an "optical path" OP for system 100 (see FIG. 3B).

The band-pass filter 144 enables the system to substantially suppress the dispersion-induced broadening of the fringes in the spectrum corresponding to the coupling resonances of the guided optical modes, as well as the dispersion-induced broadening (smoothing) of the reflectance-intensity transition around the critical angle. In addition, when the band-pass filter 144 is placed along A2 close to the digital detector 150, it can provide a measurement convenience through assuring that only the reflected light beam 116R makes it through to the digital detector 150.

With continuing reference to FIGS. 3A and 3B, the system 100 can include a first or first and second light-blocking members 200 respectively arranged along the first and second axes A1 and A2 within the first and second optical paths OP1 and OP2 and adjacent the input and output surfaces 43 and 45 of the coupling prism. The light-blocking members 200 are discussed in greater detail below.

The optional attenuator 146 helps assure that the detected reflected light beam 116R has the appropriate intensity distribution for efficient digital detection with substantial avoidance of saturation of pixels when such saturation could be considered detrimental to measurement accuracy. That being said, as discussed below, attenuating the light beam 116 does not improve the mode spectrum contrast in cases where there the CS substrate 10 has a sharp refractive index profile n(z) or where the CS substrate 10 is very thin.

The TM-TE polarizer 148 defines adjacent TM and TE sections for the digital detector so that TM and TE mode spectra can be simultaneously captured by adjacent sections of the digital detector 150. The TM and TE mode spectra are embodied in the first detector signal SA sent to the controller 130 for processing. It is noted that the order of the band-pass filter 144, the attenuator 146 and the detector optical system 142 can be changed and the order shown is by way of example.

Additional configurations and modifications can be made to system 100, some of which are described in greater detail below in connection with carrying out the enhanced measurement methods disclosed herein.

Mode Spectrum

Figure 4A:
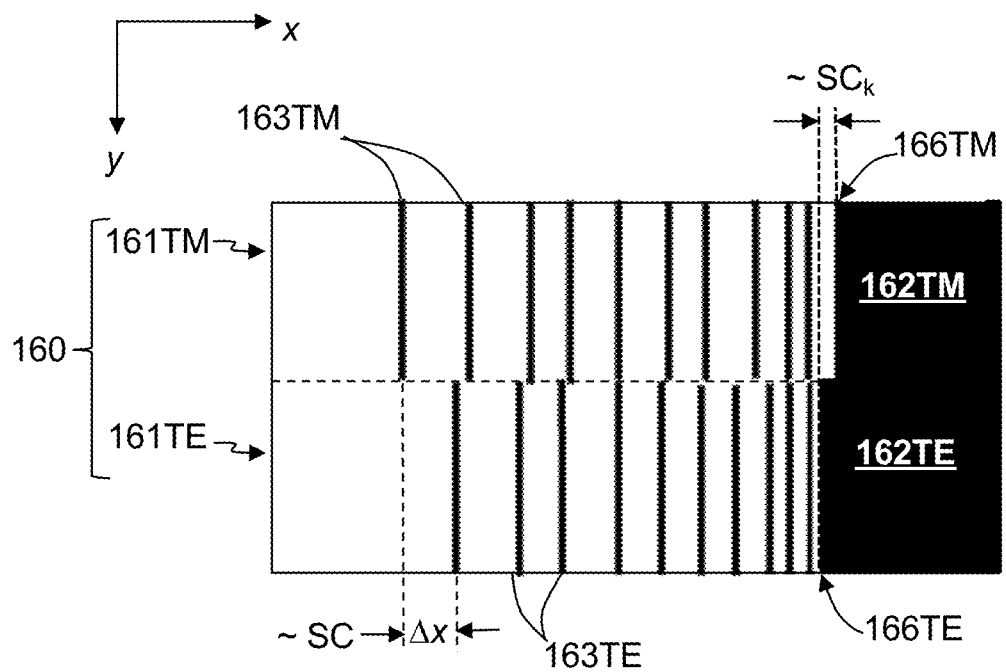
FIG. 4A is a schematic diagram of an example mode spectrum (or mode spectrum image) for an example CS substrate as obtained by the evanescent prism coupling system of FIG. 3 and showing the mode lines (fringes) spaced apart in the x-direction of the local x-y coordinate system.

FIG. 4A is a schematic representation of an idealized mode spectrum 160 as captured by the digital detector 150. Local (x,y) Cartesian coordinates are shown for reference. The mode spectrum 160 includes TM and TE total-internal-reflection (TIR) sections 161TM and 161TE respectively associated with TM and TE guided modes, and non-TIR TIR sections 162TM and 162TE respectively associated with TM and TE radiation modes and leaky modes. In one embodiment the TIR section 161TM includes one or more TM mode lines or TM "fringes" 163TM while the TIR section 161TE includes one or more TE mode lines or TE "fringes" 163TE. The TM and TE mode lines 163TM and 163TE are generally aligned in they direction and are spaced apart in the x direction by differing amounts denoted Δx. The mode spectrum 160 is also referred to herein as the "mode spectrum image" when discussing the mode spectrum as captured and then processed by the digital detector 150. In another embodiment at least one of the TIR sections does not include mode lines, and the system may be operated without relying on mode lines, e.g., by relying on the sharpness of the reflectance-intensity transition between the bright TIR section and the dark non-TIR section.

Transition regions ("transitions") 166TM and 166TE between the TIR section 161TM, 161TE and the non-TIR sections 162TM, 162TE define a critical angle for the optical coupling into and out of the NSWG 18 of the CS substrate 10 for TM and TE polarized light, and are referred to as the critical angle transitions. The difference in locations of the start of the critical angle transitions 166TM and 166TE is proportional to the knee (compressive) stress $SC_k$ and this proportionality is indicated by "$\sim SC_k$" in FIG. 3B.

The TM and TE mode lines 163TM and 163TE can either be bright lines or dark lines, depending on the configuration of system 100. In FIG. 4A, the TM and TE mode lines 163TM and 163TE are shown as dark lines for ease of illustration.

The stress characteristics for the measurement are calculated based on the difference in the x positions of the TM and TE mode lines 163TM and 163TE in the mode spectrum 160. The birefringence B as a function of depth is the difference between the TM and TE index distributions as a function of depth. Birefringence may also be defined as a function of the effective indices of the TM and TE modes, wherein the effective indices are represented by the x positions of the mode lines in the captured spectrum on the sensor. The surface compressive stress S(0)=SC is computed by a surface birefringence B(0) obtained by extrapolated surface TM and TE indices found from extrapolation of the x distances (Δx) between the mode lines (effective indices), forming the ratio B(0)/SOC, where SOC is the stress optic coefficient.

At least two TM and TE mode lines 163TM and 163TE are needed to calculate the surface compressive stress S(0). Additional mode lines enable the calculation of the compressive stress profile S(z). The depth of layer DOL can be a measure of stress penetration or ion penetration length into the body 11 of the CS substrate 10, and in the case of an IOX process, can also be calculated by the x-locations and number of mode lines 163TM and 163TE. The TM and TE mode line locations along the x axis are thus the most basic parameters for inferring stress-related characteristics of the CS substrate 10 and must be determined with the greatest accuracy possible to obtain the best (most accurate) measurement of stress-related properties of the CS substrate. The calculations for determining the stress-related characteristics of the CS substrate 10 are carried out in the controller 130.

Figure 4B:
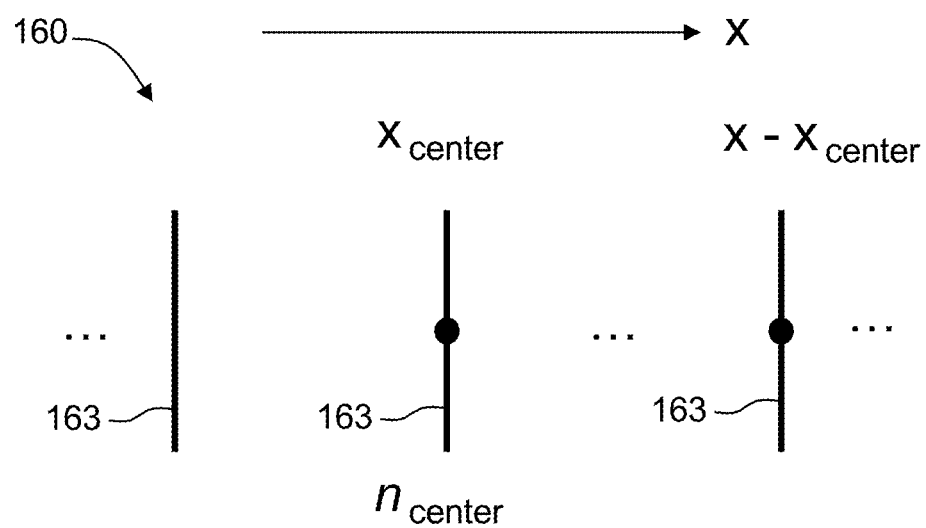
FIG. 4B is a close-up view of example mode lines showing an example of how a known effective index $n_{eff}=n_{center}$ at a center position $x_{center}$ of the mode spectrum image can be used to calculate the propagation constants $\beta=\beta_{center}$ and the other effective indices $n_{eff}(x)$ in the mode spectrum image.

Depending on polarization, the position of the fringes 163TM or 163TE may change as the sample may have different values due to birefringence. FIG. 4B is a close-up view of example mode lines 163 (which can be either TM or TE mode lines) showing an example of how a known effective index $n_{eff}=n_{center}$ at a center position $x_{center}$ of the mode spectrum image can be used to calculate the propagation constants $\beta=\beta_{center}$ and the other effective indices $n_{eff}(x)$ in the mode spectrum image.

Based on this knowledge, the effective indices $n_{eff}$ projected by the coupling prism 42 can be computed using equations (1) and (2) below:

$$\beta_{center} = \sin^{-1}\left(n_{prism}\sin\left(\sin^{-1}\left(\frac{n_{center}}{n_{prism}}\right)-\alpha\right)\right) \quad (1)$$

$$neff(x) = \sin\left\{\alpha + \sin^{-1}\left[\frac{1}{n_{prism}}\sin\left(\beta_{center} + \tan^{-1}\left(\frac{x-x_{center}}{F}\right)\right)\right]\right\} \quad (2)$$

where F is the focal length of the detector optical system 142. Equations (1) and (2) are polarization independent. Depending on the index of the sample, the position will be mapped differently and shifted related to the center. Therefore, these equations can be used to map the mode lines 163 of the guided modes from the position x to the index $n_{eff}(x)$ relative to the index known at $x_{center}$.

When measuring very thin CS substrates 10 or CS substrates having a sharp change in refractive index near the CS substrate surface 12, it has been observed that the captured mode spectrum fringes 163 are blurred or weak, which results in a reduced-contrast mode spectrum 160. This represents a weak signal to noise ratio that leads to undetectable fringes 163 or very high deviations on repeated measurements.

Figure 5A:
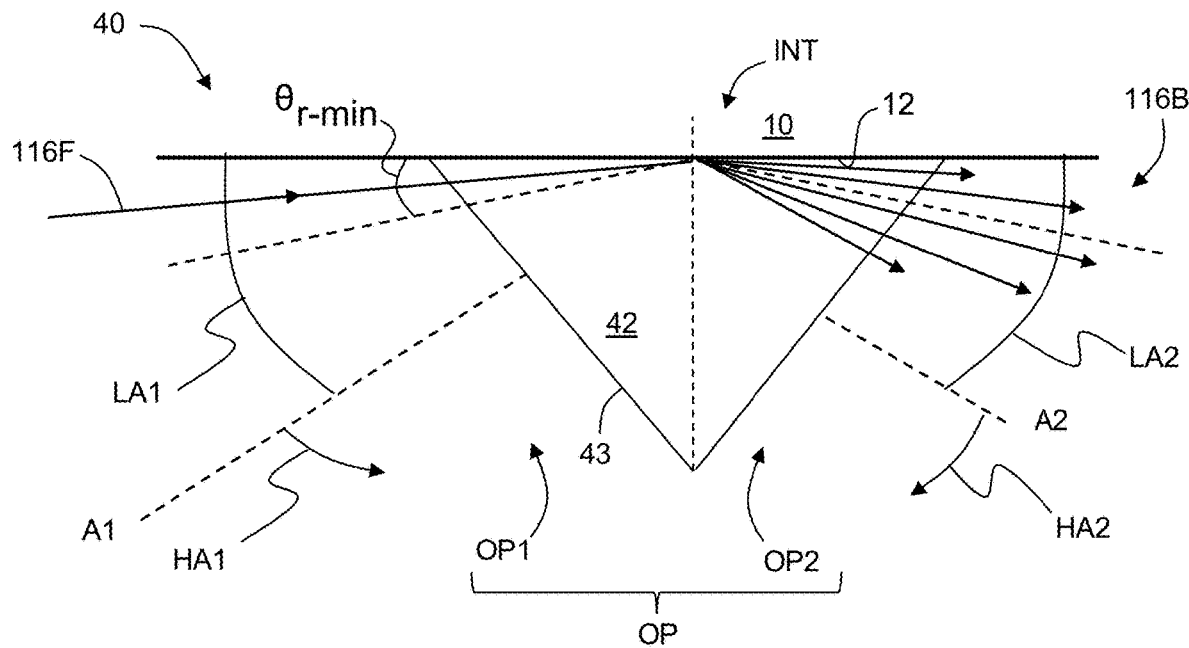
FIG. 5A is a close-up view of the prism coupling assembly without the light blocking member and showing how relatively low-angle measurement light traveling with the low-angle region of the optical path can give rise to background light that can overlap with and substantially adversely affect the contrast of low-order mode lines in the mode spectrum image.

It appears that this reduction in mode spectrum contrast is due to a significant amount of the measurement light 116 (e.g., the focused measurement light 116F) reaching the digital detector 150 as background light. FIG. 5A is a close-up view of the prism coupling assembly 40 without the light blocking member 200. The prism coupling assembly includes a first or input low-angle region LA1 that extends from the surface 12 of the CS substrate 10 to the first axis A1. The prism coupling assembly also includes a second or output low-angle region LA2 that extends from the surface 12 of the CS substrate 10 to the second axis A2. The prism coupling assembly further includes a first or input high-angle region HA1 that extends from the first axis A1 in the direction away from the CS substrate 10. The prism coupling assembly further includes a second or output high-angle region HA2 that extends from the second axis A2 in the direction away from the CS substrate 10.

The first and second low-angle regions LA1 and LA2 combine to form a system low-angle region for the (system) optical path OP. Likewise, the first and second high-angle regions HA1 and HA2 combine to form a system high-angle region for the (system) optical path OP. It can also be said that the optical path OP comprises a low-angle region and a high-angle region.

FIG. 5A shows the measurement light 116F traveling in the first low-angle region LA1 and reflecting from the CS substrate surface 12 as background light 116B that travels in the second-low-angle region LA2. This background light 116B has a range of angles due to the diffuse nature of the measurement light and can overlap the angles associated with the lower-order mode lines of the mode spectrum image. This in turn can adversely affect the contrast of low-order mode lines in the mode spectrum image 160. Note that the low-angle measurement light 116F will reflect strongly from the CS substrate 10.

Figure 5B:
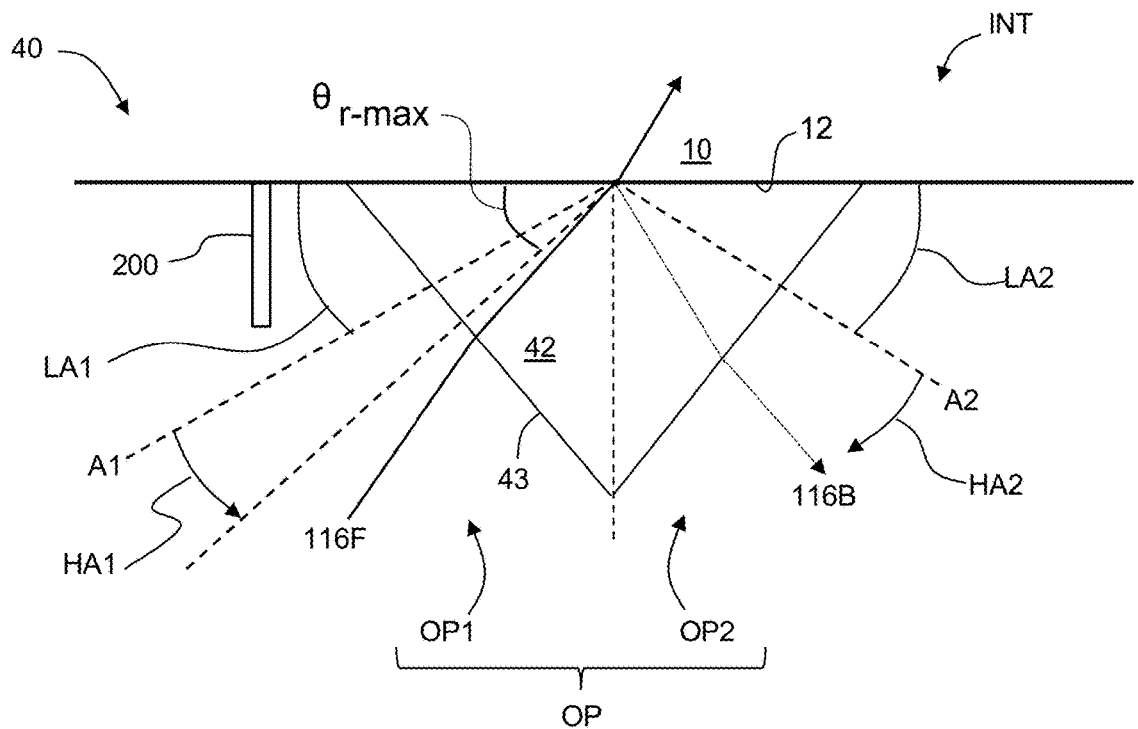
FIG. 5B shows how relatively large-angle measurement light in the high-angle region gives rise to a relatively small amount of background light that does not substantially affect the higher-order modes of the mode spectrum image.

FIG. 5B shows relatively high-angle measurement light 116F that resides in the first high-angle region and even beyond the maximum elevation incident angle $\theta_{r\text{-}max}$. While such light will also give rise to background light 116B that can reach the digital detector 150, most of the light is transmitted through the CS substrate 10 so that only a relatively small amount of background light 116B is generated. This means that the background light 116B within the second low-angle region LA2 has the greatest adverse impact on the mode spectrum image 160. Thus, the term background light 116B as used hereinafter means low-angle background light or background light that travels within the second low-angle region LA2.

Note that the background light 116B can be generated from focused measurement light 116F that is below the minimum elevation incident angle for mode coupling $\theta_{r\text{-}min}$ as well above this minimum angle. This is an important point because usually the focused measurement light 116F overfills the range of coupling angles of the NSWG 18 to ensure that measurement light is coupled into all of the available waveguide modes.

Figure 5C:
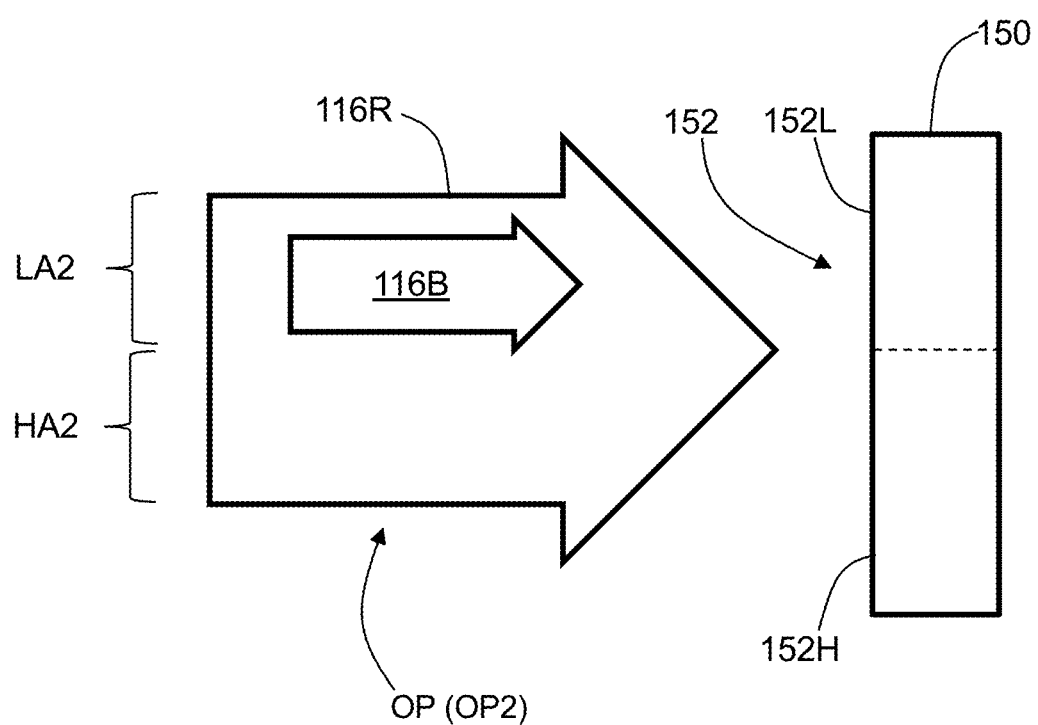
FIG. 5C is a schematic diagram that shows the reflected measurement light that includes the mode spectrum information and also shows the background light overlapping with the reflected measurement light in the second low-angle region, and also showing how this light is incident upon the digital detector.

FIG. 5C is a schematic diagram that shows the reflected measurement light 116R that includes the mode spectrum information and also shows the background light 116B overlapping with the reflected measurement light in the second low-angle region LA2. The digital detector surface 152 has a lower-order-mode region 152L where the lower-order mode lines 163 are detected and a higher-order-mode region 152H where the higher-order mode lines 163 are detected. The background light 116B is shown overlapping the portion of the reflected measurement light 116R that is incident upon the lower-order mode region 152L of the digital detector surface 152. It is this background light 116B that reduces the contrast of the mode spectrum image and that needs to be reduced or eliminated.

Light-Blocking Members

Figure 5D:
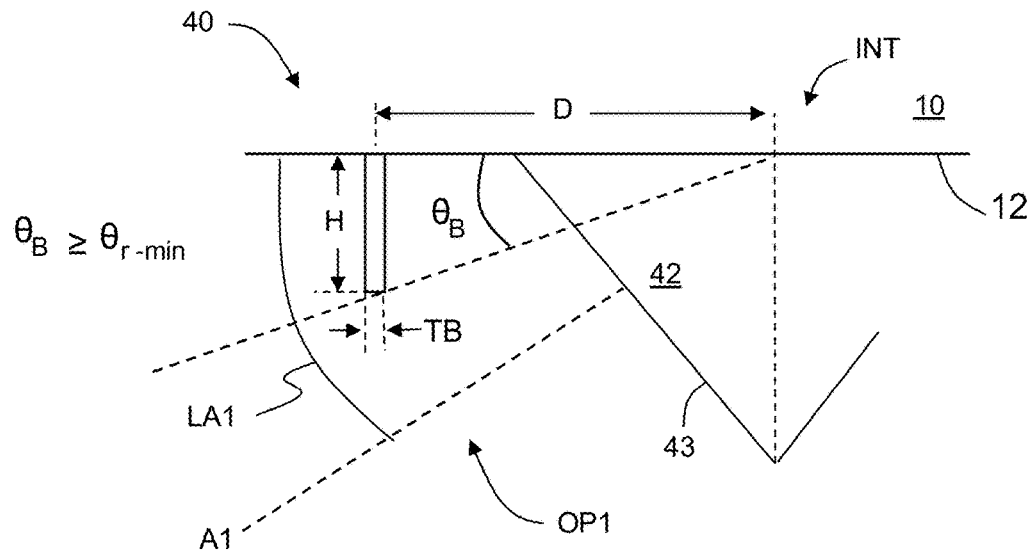
FIG. 5D is a schematic diagram that shows an example configuration of the prism coupling assembly that includes light-blocking member that extends into a first low-angle region and shows the relevant geometrical parameters.

FIG. 5D is a schematic diagram that shows an example configuration of the prism coupling assembly 40 that includes a light-blocking member 200 and shows the relevant geometrical parameters, namely the height H and the distance D from the coupling interface INT. The light-blocking member 200 extends from the plane of the surface 12 of the CS substrate (or in the vicinity of the plane) and into the first low-angle region LA1. In an example, this extension is substantially orthogonal to the plane of the surface 12. A benefit of this orientation is that any light reflected from the light-blocking member 200 is directed away from the optical path and not back toward the light source 112.

Note that the light-blocking member does not extend into the first high-angle region HA1. Generally, the light-blocking members 200 are limited to the low-angle region and thus block only low-angle light, i.e., they do not block any high-angle light in the high-angle region. In some cases, only a portion of the low-angle light is blocked.

The amount of the low-angle measurement light 116F blocked by the light-blocking member 200 depends on the distance D as well as the height H. An elevation light-blocking angle $\theta_B$ can be defined using equation (4) below:

$$\theta_B = \tan^{-1}\left(\frac{H}{D}\right) \qquad (3)$$

As the elevation light-blocking angle $\theta_B$ increases, more of the low-angle measurement light incident upon the coupling interface INT will be blocked or attenuated. A given elevation incident angle $\theta_r$ that corresponds to the allowable waveguide modes of the NSWG 18 is defined by the system geometry and the refraction law at the prism/glass under test interface and are described by equation (4A) below as:

$$\sin(90° - \theta_r) = \frac{n_m}{n_p} \qquad (4A)$$

where $n_m$ is the effective index of the $m^{th}$ mode line (i.e., the mode effective indices of the NSWG 18, which could also be expressed as $n_{eff\text{-}m}$) and $n_p$ is the refractive index of the prism. These higher elevation incident angles $\theta_r$ corresponded to the lower effective indices, since the prism refractive index $n_p$ is a fixed number. The elevation critical angle $\theta_r = \theta_c$ is given by equation (4B) below as:

$$\theta_c = 90° - \sin^{-1}\frac{n_s}{n_p} \qquad (4B)$$

Where the $n_s$ is the refractive index of the substrate or the lowest index of the waveguide measured (which may happen in cases of diffusion of multiple ions in lithium glasses). Here $n_p > n_s$ in order for a critical angle to occur.

Figure 5E:
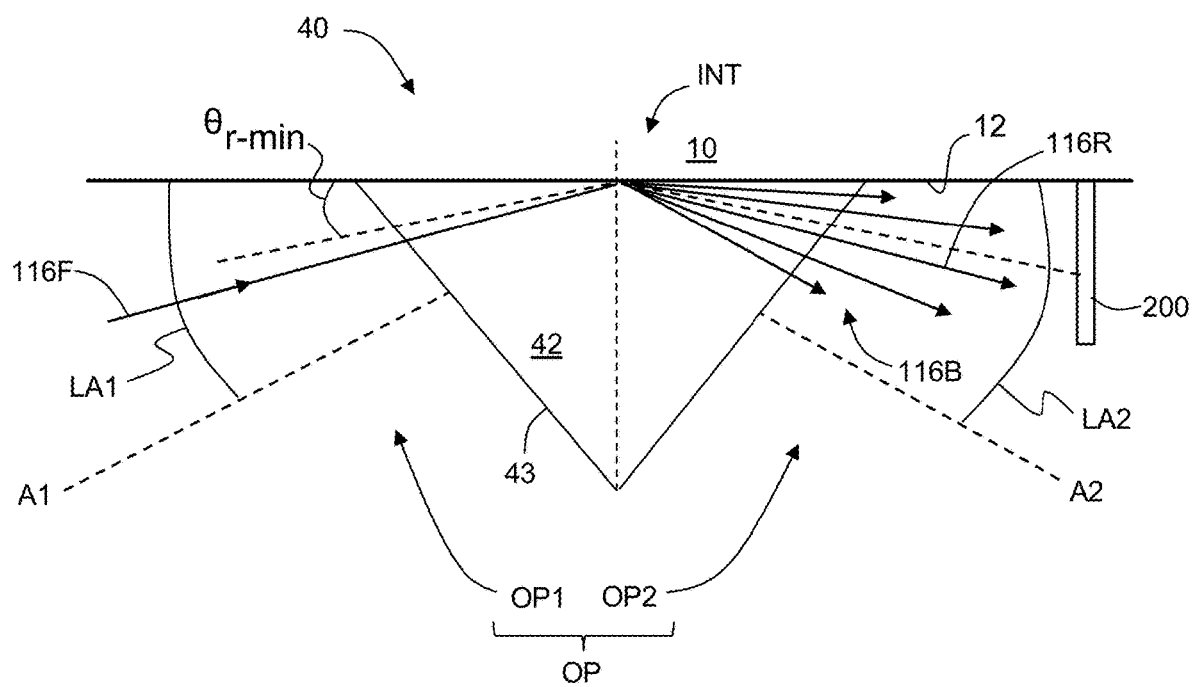
FIG. 5E is similar to FIG. 5B and shows how a light-blocking member can be disposed downstream of the coupling prism in the second low-angle region to block low-angle light that includes the background light.

FIG. 5E is similar to FIG. 5A, with the addition of a light-blocking member 200, and shows how a light-blocking member 200 can be operably disposed downstream of the coupling prism 42 to block at least a portion of the low-angle light in the second low-angle region LA2, wherein a portion of this low-angle light includes background light 116B as well as the low-angle portion of the reflected measurement light 116R that defines the mode lines in the mode spectrum image 160.

Figure 5F:
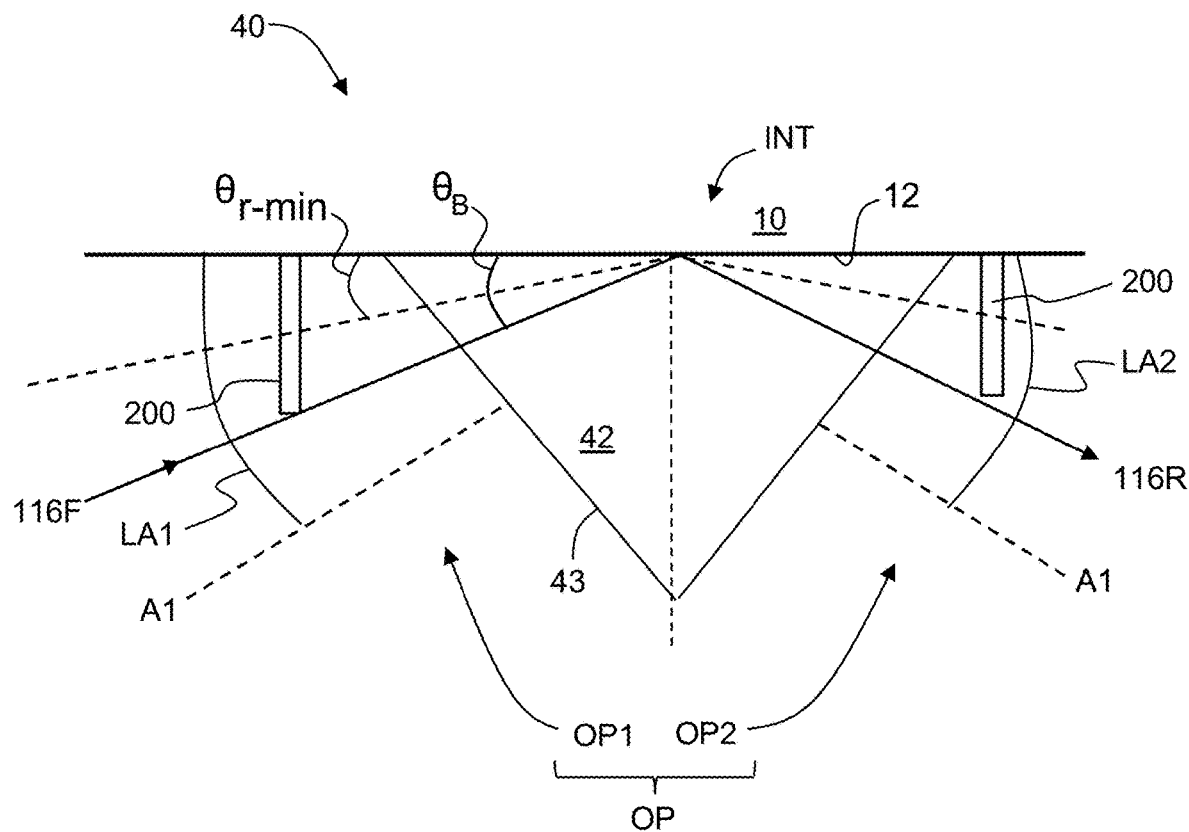
FIG. 5F shows a close-up view of the coupling prism assembly that includes first and second light-blocking members respectively arranged to extend into the first and second low-angle regions.
Figure 6A:
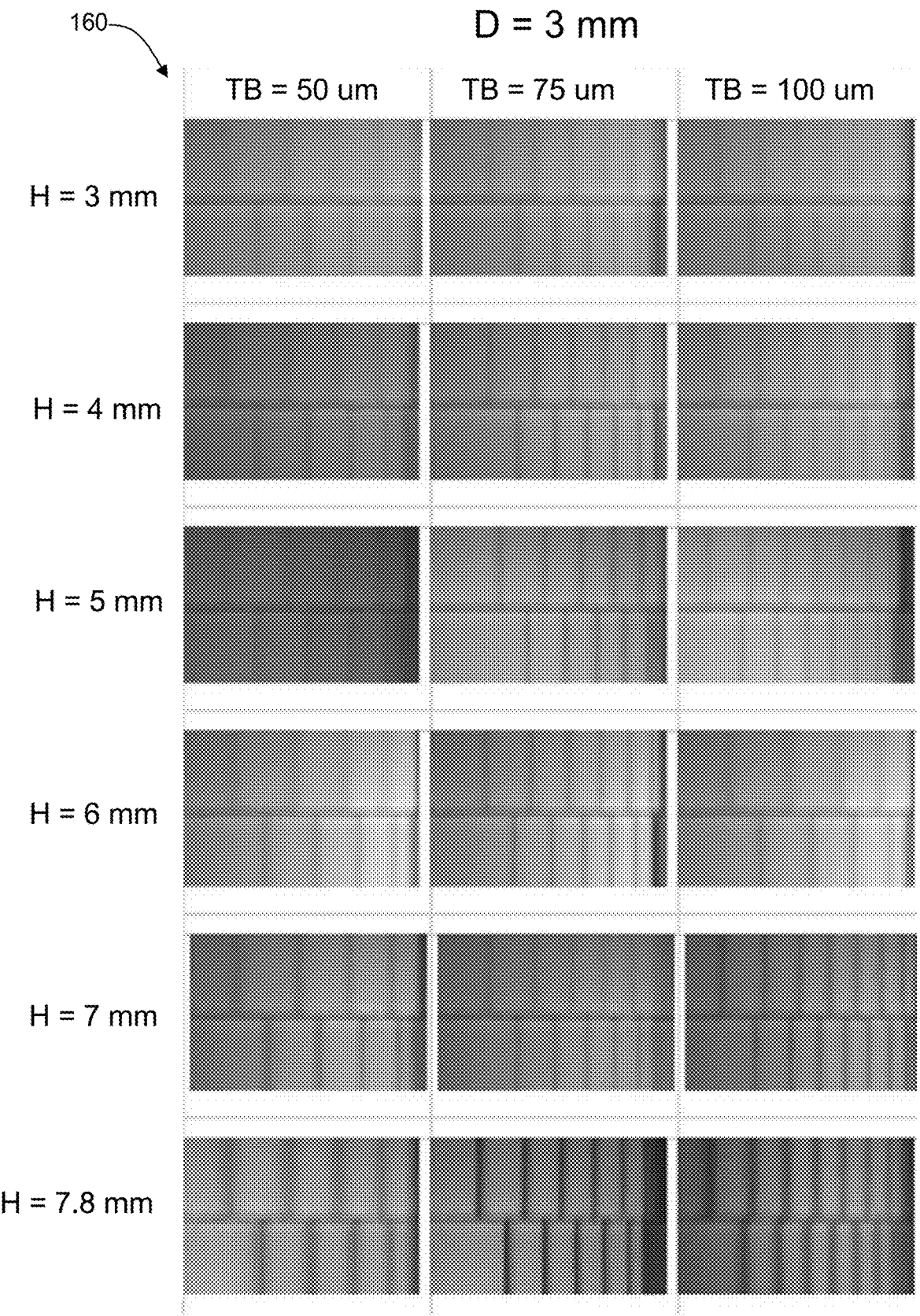
FIGS. 6A through 6F are actual captured mode spectrum images obtained during the experimental measurements of a CS substrate to establish the effects of the light-blocking members on the contrast of the mode spectrum image.
Figure 6B:
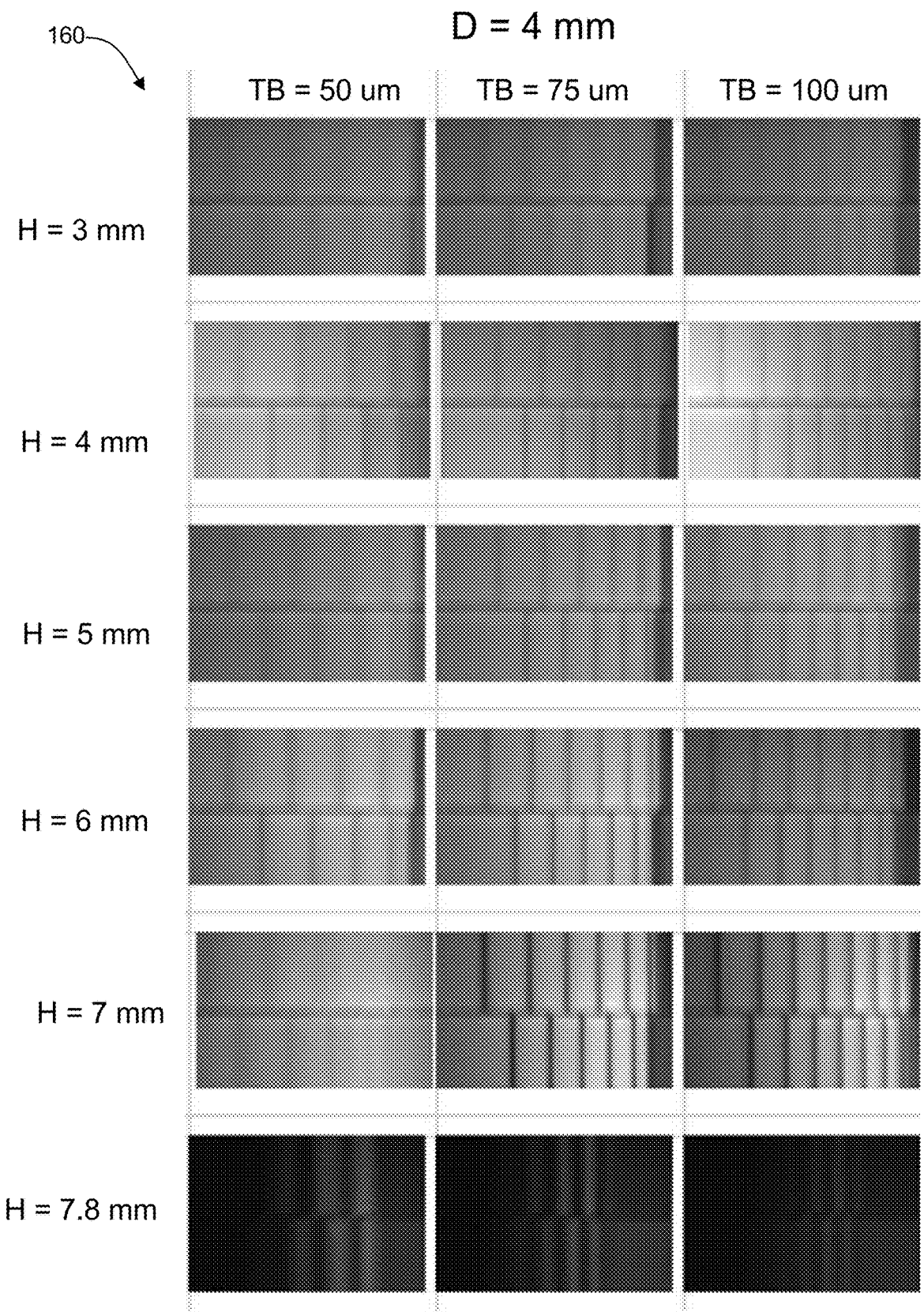
Figure 6C:
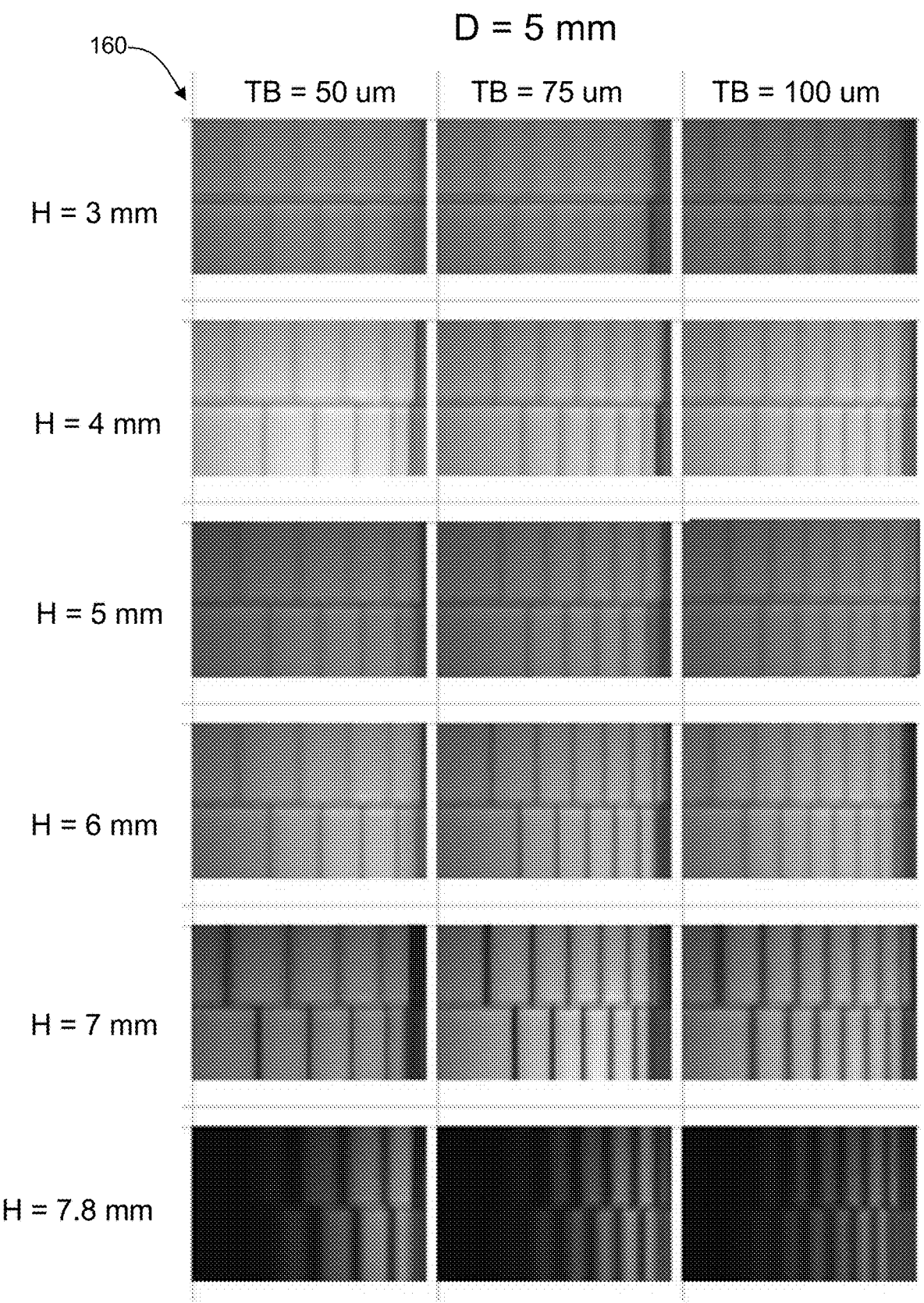
Figure 6D:
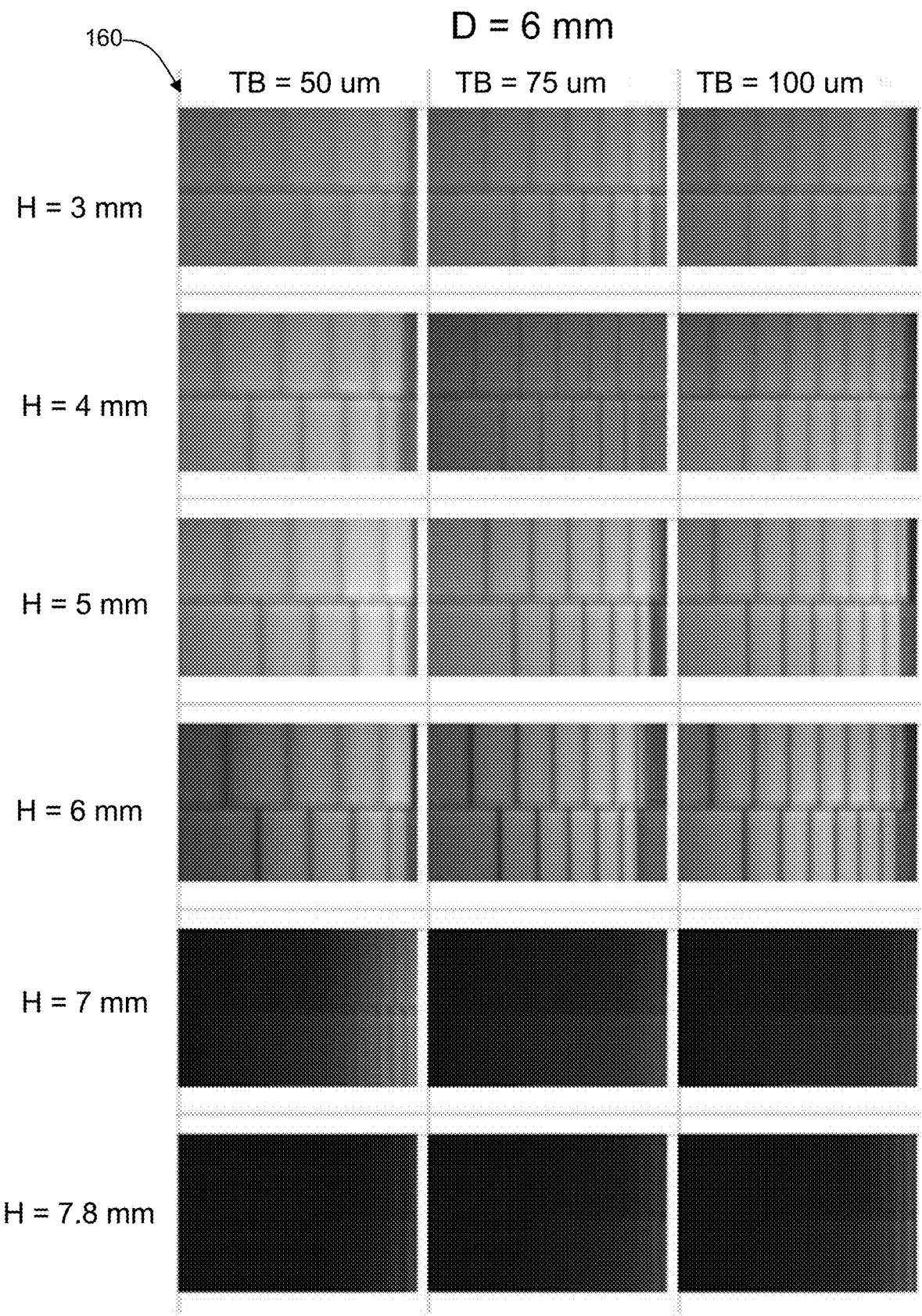
Figure 6E:
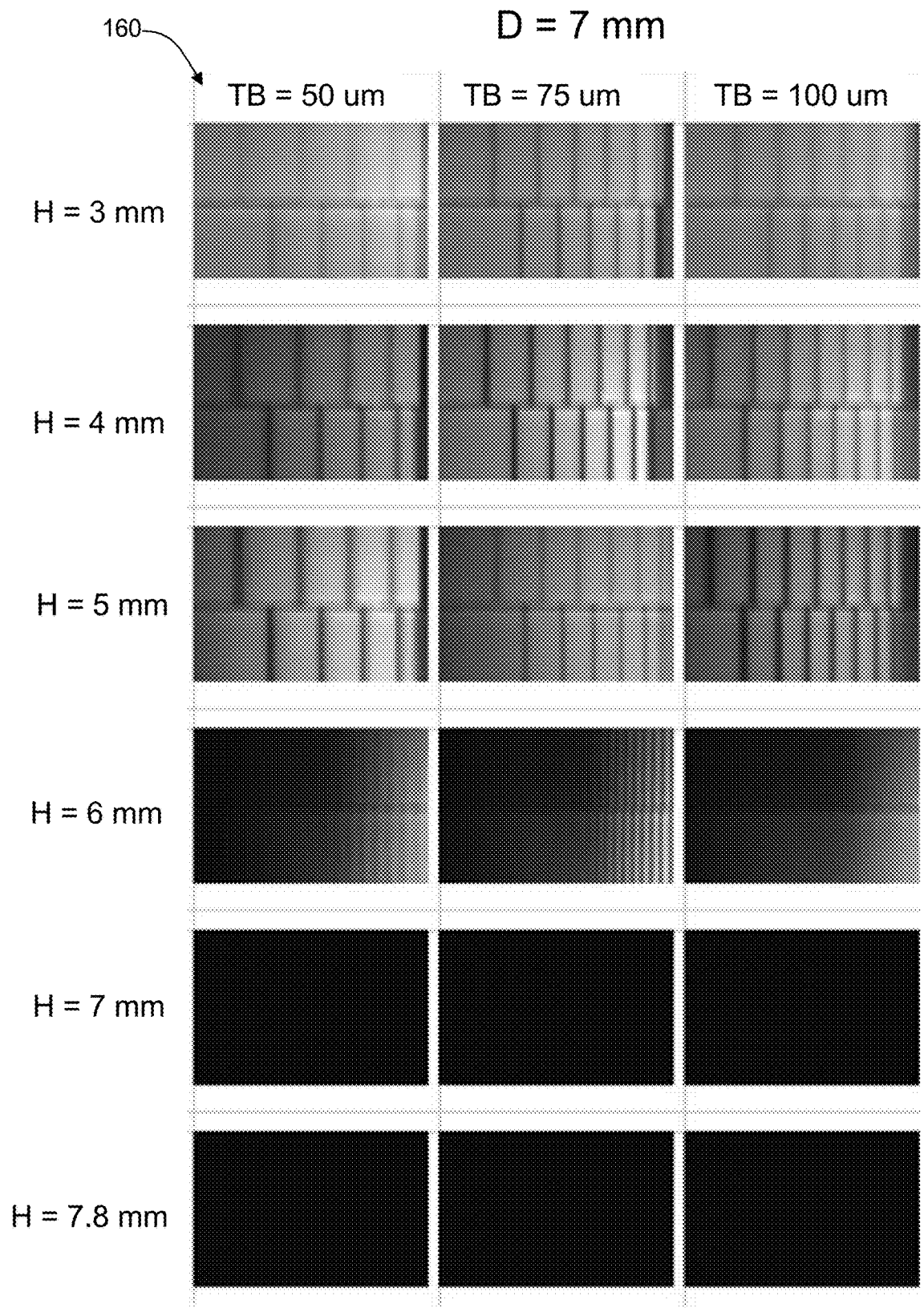
Figure 6F:
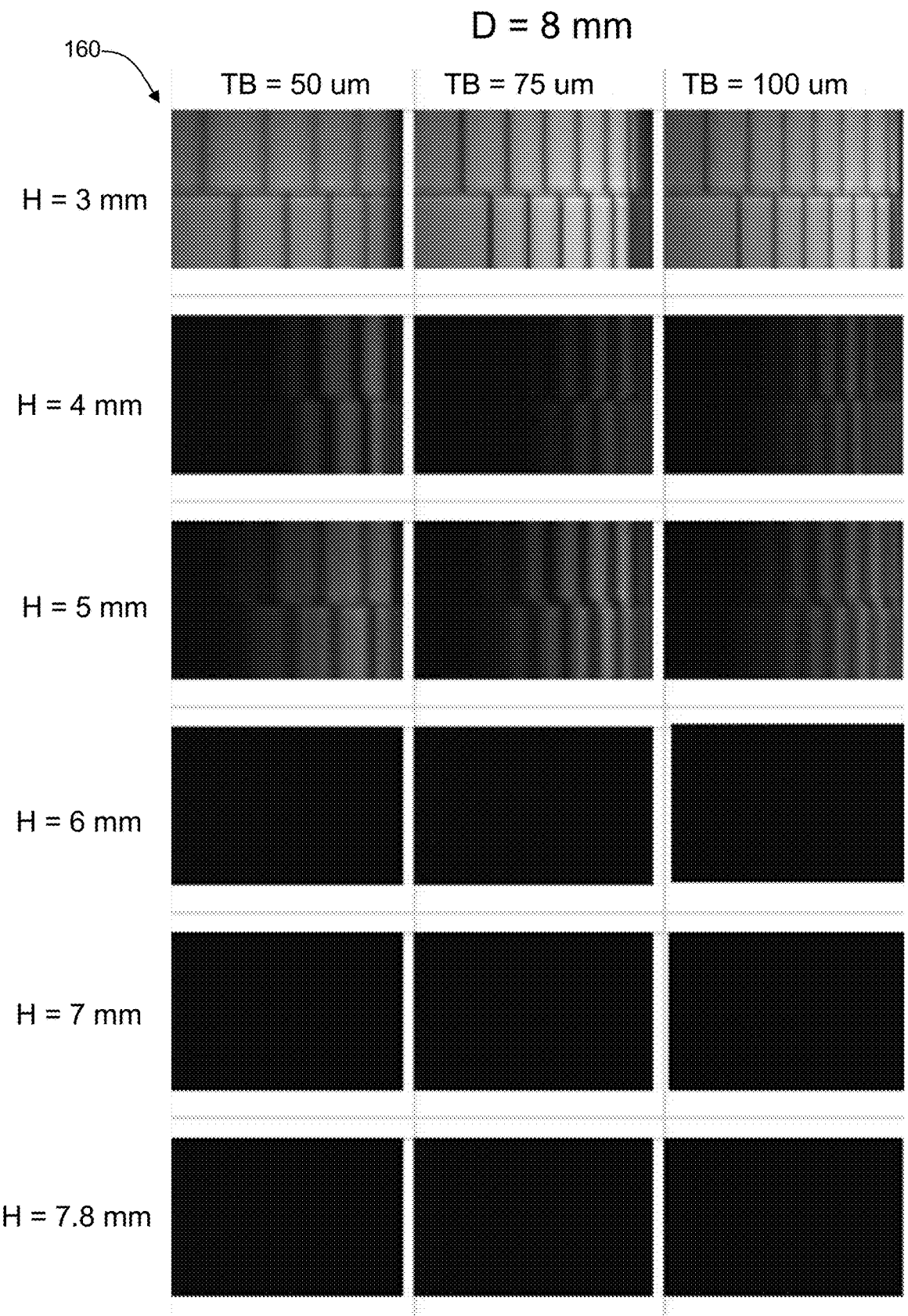

FIG. 5F is similar to FIG. 5B and shows how two light-blocking members 200 can be operably disposed upstream and downstream of the coupling prism 200 in the first and second low-angle regions respectively to enhance the blocking of low-angle light within the system 100 during a measurement.

Note that the usual type of attenuation of the measurement light beam 116R alone is insufficient to solve the problem of reduced mode spectrum contrast for sharp refractive index profiles and/or thin CS substrates because such attenuation operates over all of angles of the measurement light and thus all of the guided modes. The invention is directed to the targeted reduction of the low-angle light in one or both of the low-angle regions LA1 and LA2 by selective use of one or more light-blocking members 200 to enhance or even optimize the contrast of the mode spectrum image 160. This ensures that the background light 116B does not interfere with the formation of the lower-order mode lines of the mode spectrum image, thereby providing the mode spectrum image 160 with sufficiently high contrast to perform a measurement of the CS substrate 10 that will allow for measuring at least one stress-related characteristic with sufficient accuracy. This is possible because measurements of stress-related properties of the CS substrate can be based on the lower-order modes alone. But simply adding any light-blocking member into the system optical path OP without some understanding of the mode spectrum image quality is not likely to be helpful. The systems, assemblies and methods disclosed herein are most useful when there is difficulty in obtaining a suitably high-contrast mode spectrum image. This situation often occurs for CS substrates 10 having a steep index profiles and/or for very thin CS substrates.

It is also believed that for the case of a thin CS substrate 10, NSWGs 18 on opposite sides of the CS substrate 18 can be close enough for the lower-order modes coupled into one of the NSWGs 18 to interact with the other NSWG, which adversely affects the contrast of the mode spectrum 160.

In an example, the mode spectrum image 160 obtained using one or more light-blocking members 200 has an increase in contrast of at least 10% as compared to the mode spectrum image obtained without using the one or more light-blocking members. Said differently, the at least one light-blocking member is configured so that a first contrast of the mode spectrum image obtained using the at least one light-blocking member is at least 10% greater than a second contrast of the mode spectrum image as captured without the at least one light-blocking member.

With continuing reference to FIG. 5F as well as FIGS. 3A and 3B, a first light-blocking member 200 is disposed in the first (input) optical path OP1 on the input side of the coupling prism 42 and within the first low-angle region LA1. A second light-blocking member 200 is disposed on the output side of the coupling prism in the second (output) optical path OP2 within the second low-angle region LA2. The light-blocking members 200 can be located on one side only, both sides symmetrically or both sides asymmetrically. A given light-blocking member 200 can be opaque, i.e., totally light blocking, or can be partially transmitting, i.e., partially opaque. For a partially transmitting light-blocking member 200, its thickness TB can be selected according to the amount of light transmission.

An aspect of the system and methods disclosed herein is directed to choosing a suitable configuration for the one or more light-blocking members 200, including obtaining a substantially optimal configuration for blocking or reducing low-angle light. Consider an example CS substrate 10 having refractive index $n_b=1.5$ and a coupling prism index $n_p=1.72$, which according to equation (5) yields an elevation incident angle $\theta_r \sim 30°$. Neglecting the refraction at the input surface 43 of the coupling prism 42, an elevation light-blocking angle $\theta_B \leq 30°$ can be used to block or attenuate low-angle light and improve contrast.

Experiments were performed to better understand how to define the maximum height $H_{max}$ for the light-blocking member 200. Equation (6) below provides one way of determining the maximum height $H_{max}$, $$H_{max}=K \cdot D \cdot \tan[90°-\sin^{-1}(n_m/n_p)] \quad (6)$$

where a correction factor K=1.1 was determined empirically and accounts for the fact that the first refraction of the measurement light 116 at the coupling prism 42 has been neglected and for the diffuse nature of the measurement light 116. The angles in equation (6) are given in degrees. The correction factor K may vary slightly depending on the particular configuration of system 100 and the types of CS substrates 10 being measured.

FIGS. 6A through 6F are actual captured mode spectrum images 160 obtained during experimental measurements of a CS substrate 10 to establish the effects of the light-blocking members on the contrast of the mode spectrum image. The experiments involved different light-blocking members 200 of height H=3.0 mm, 4.0 mm, 5.0 mm, 6.0 mm, 7.0 mm and 7.8 mm. First and second light-blocking members 200 were respectively disposed in the first and second optical paths OP1 and OP2 within the respective first and second low-angle regions LA1 and LA2. The distances D were set at D=12.7 mm. Light-blocking members 200 of thicknesses TB (see FIG. 5D) of 50 um, 75 um and 100 um are also shown, with the different thickness corresponding to different levels of opacity of the light-blocking members. The refractive index of the prism $n_p=1.72$. The CS substrate had a thickness TH of 100 microns.

FIGS. 6A through 6F show that as the height H initially increases, the fringes (mode lines) initially becomes more visible. However, if the height H becomes too large, it blocks the measurement light 116 completely, especially if first and second light-blocking members 200 are used on opposite sides of the coupling prism 42. It was found for the particular configuration of system 100 that light-blocking members 200 having a height H between 4 mm and 6 mm provide the best trade-off between fringe visibility and image uniformity.

Results of experiments carried out for the case of two symmetric light-blocking members 200 in the first and second optical paths OP1 and OP2 within the first and second low-angle regions LA1 and LA2 respectively is summarized in Table 1 below.

TABLE 1

| H (mm) | $\theta_B$ (deg) | SC (MPa) | DOL(um) |
| --- | --- | --- | --- |
| 3.0 | 13.2 | Not possible | Not possible |
| 4.0 | 17.4 | 834 | 16.2 |
| 5.0 | 21.4 | 818 | 16.9 |
| 6.0 | 25.3 | 822 | 16.3 |
| 7.0 | 28.8 | Not possible | Not possible |
| 7.8 | 31.6 | Not possible | Not possible |

Table 1 shows that for H<3 mm, measurements of the compressive stress SC and depth of layer DOL were not possible due to poor mode spectrum contrast. For H=4 mm, 5 mm and 6 mm, the mode spectrum contrast was deemed suitable to perform a measurement of the compressive stress SC and the depth of layer DOL. For H>7 mm, the selective attenuation was too excessive to allow for a measurement.

By computing the equivalent elevation light blocking angle $\theta_B$, it can be seen that this angle grows towards 30 degrees, which is close to the predicted limit. For a single light-blocking member 200 of H=7 mm or 7.8 mm, a measurement was made possible by increasing contrast of the digital detector 150. This led to the use of a correction coefficient of K=1.1 in equation (6).

Figure 7A:
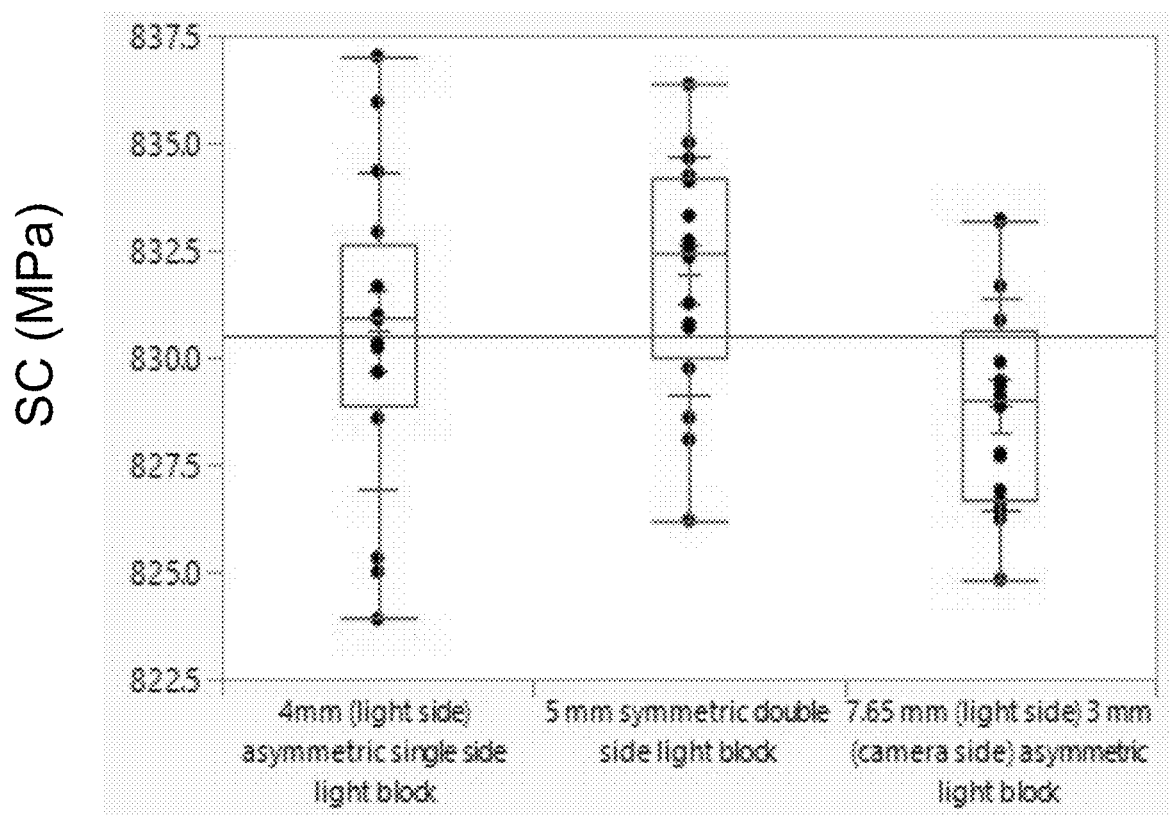
FIG. 7A is a plot of measurements of the compressive stress SC (MPa) for a sample CS substrate for three different configurations of the light-blocking members illustrating a distribution of measured CS values for each configuration.

FIG. 7A plots the distribution of measurements of compressive stress SC (MPa) for three different light-blocking configurations, namely: a) single asymmetric light-blocking member 200 of H=4 mm, b) double-side light-blocking members of H=5 mm, and c) a first light-blocking member 200 of H=7.65 mm in the first optical path OP1 and a second asymmetric light-blocking member of H=3 mm in the second optical path OP2. The data show that dual sided symmetric and dual sided asymmetric configurations seem to provide a smaller standard deviation than the single sided asymmetric configuration. However, the difference is still relatively small.

Figure 7B:
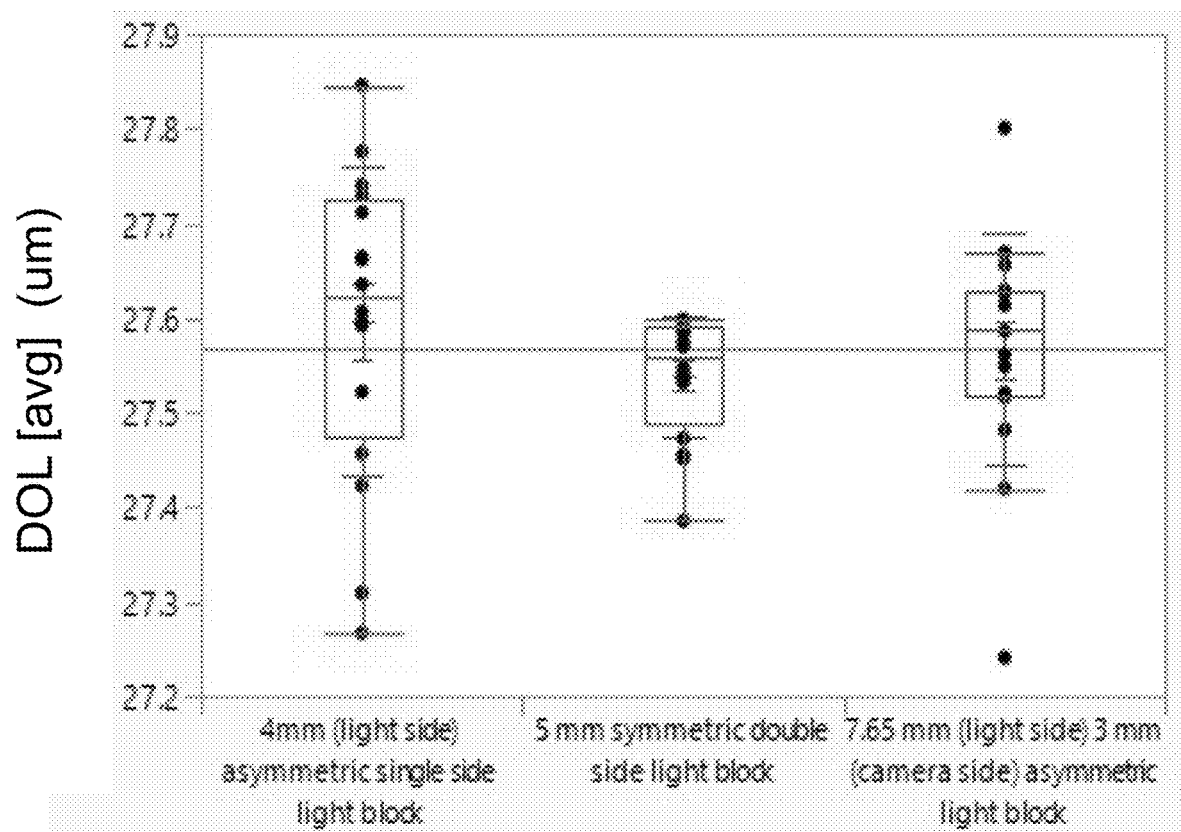
FIG. 7B is a plot of measurements of the depth of the average layer DOL (microns) for a sample CS substrate for the same three different configurations of the light-blocking members of FIG. 7A and illustrating a distribution of measured DOL values for each configuration.

FIG. 7B is similar to FIG. 7A and used the same configurations to analyze the variation in the measurements of the depth of layer DOL (mm). Here the symmetric double-sided configuration seems to provide the smallest standard deviation, but all the measurement results have sufficient accuracy for process control purposes.

Figure 8A:
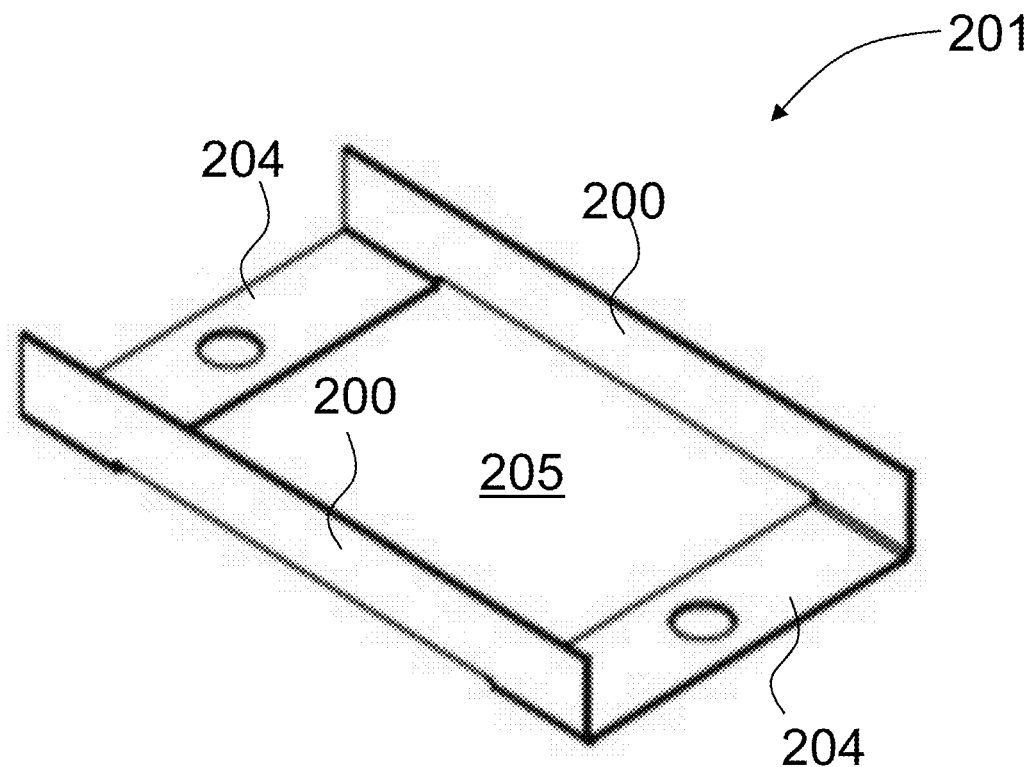
FIG. 8A is an example light-blocking structure that includes first and second light-blocking members.
Figure 8B:
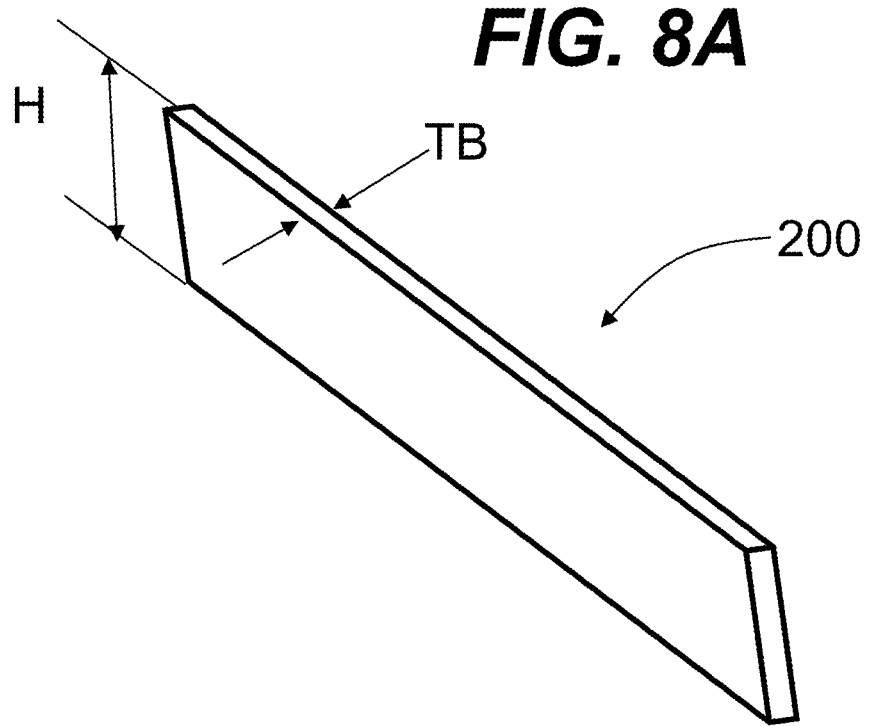
FIG. 8B is an elevated view of an example light-blocking member.

FIG. 8A is an elevated view of an example light-blocking structure 201 that includes two light-blocking members 200 supported by two cross-members 205 that define a central region 205 where the coupling prism 205 can reside. The light-blocking members 200 need not have the same height H and can be disposed at different distances D. Example materials for the light-blocking members include metal and plastic. In some cases, it is helpful to have the light-blocking members 200 be as non-reflective and as non-scattering as possible to avoid generating stray light. FIG. 8B is an elevated view of an example light-blocking member 200.

In an example, the light-blocking members 200 can have an adjustable height H and/or adjustable distance D to facilitate setting up the system 100 for optimum measurement performance. Also, in other examples the height H need not be constant. In an example, the one or more light-blocking members can be moved by a moving device (not shown), such as a translation stage or linear motor, and controlled by the controller 130. This configuration can be used to perform real-time adjustment of the one or more light-blocking members to obtain improved or optimized measurement capability for system 100 when measuring CS substrates that are otherwise not measurable due to at least one of a sharp index profile and small substrate thickness.

Figure 8C:
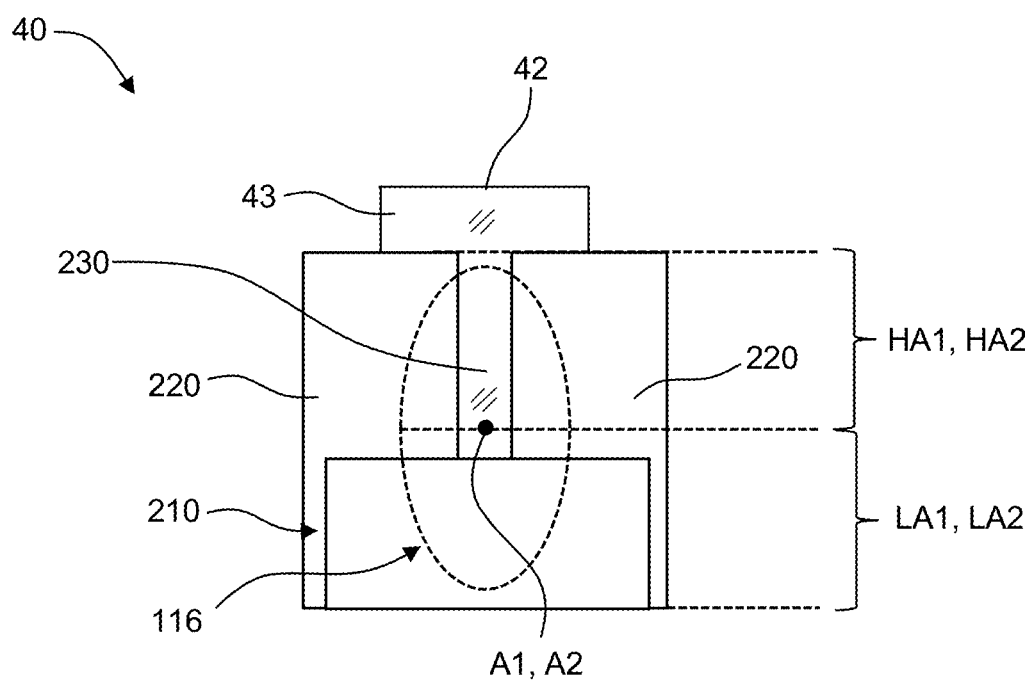
FIG. 8C is an input-end view of an example prism coupling assembly that shows the use of a "horizontal" light-blocking member as disclosed herein along with two vertical blinds to define an aperture through which mostly low-order-measurement light passes to the coupling prism.

FIG. 8C is an input-end view of an example prism coupling assembly 40 that shows the use of a "horizontal" light-blocking member 200 as disclosed herein. Also shown are two vertical blinds 220 that along with the light-blocking member 200 define an aperture 230. The low-angle region LA1 (or LA2) and the high-angle region HA1 (or HA2) are also shown. Note that the aperture 230 passes all of the measurement light in the high-angle region HA1 (or HA2) while blocking a portion of the light in the low-angle region LA1 (or LA2). Note also that each vertical blind 220 blocks portions of the light traveling in both the low-angle region LA1 (or LA2) and the high-angle region HA1 (or HA2) while the light-blocking member 200 blocks only the low-angle light associated with the low-angle region LA1 (or LA2).

It will be apparent to those skilled in the art that various modifications to the preferred embodiments of the disclosure as described herein can be made without departing from the spirit or scope of the disclosure as defined in the appended claims. Thus, the disclosure covers the modifications and variations provided they come within the scope of the appended claims and the equivalents thereto.

What is claimed is:

1. A prism coupling system configured to determine at least one stress characteristic in a chemically strengthened substrate having a surface and a near-surface waveguide, comprising:
    a light source system that generates measurement light;
    a coupling prism to provide optical coupling of the measurement light into and out of the near-surface waveguide over an optical path that comprises a low-angle region and a high-angle region;
    a detector system arranged to receive the measurement light from the coupling prism to detect a mode spectrum image; and
    a light-blocking member operably disposed to at least partially extend into the low-angle region without extending into the high-angle region,
    wherein the mode spectrum image has a first contrast and wherein the light-blocking member is configured so that the first contrast is at least 10% greater than a second contrast of the mode spectrum image as captured without the light-blocking member, and
    wherein an elevation light-blocking angle corresponding to a height of the light-blocking member is from greater than 17.4° to less than 25.3°, and the elevation light-blocking angle is measured from a tangent line tangent to the surface of the chemically strengthened substrate at a location where the optical path impinges the surface of the chemically strengthened substrate to an outer periphery of the light-blocking member further from the tangent line, and the light-blocking member extends from a location on the tangent line for the height to the outer periphery.

2. The prism coupling system according to claim 1, further comprising a second light-blocking member disposed in a second low-angle region, and a height of the second light-blocking member corresponds to a second elevation light-blocking angle from greater than 17.4° to less than 25.3°, wherein the second elevation light-blocking angle is measured from the tangent line to an outer periphery of the second light-blocking member furthest from the tangent line, and the second light-blocking member extending from a location on the tangent line for the height to the outer periphery of the second light-blocking member.

3. The prism coupling system according to claim 1, wherein the light-blocking member is opaque.

4. The prism coupling system according to claim 1, wherein the light-blocking member is semi-opaque.

5. The prism coupling system according to claim 1, wherein the light-blocking member has at least one of an adjustable height and an adjustable distance from the coupling prism.

6. The prism coupling system according to claim 1, wherein the chemically strengthened substrate has a thickness of less than 250 microns.

7. A method of determining at least one stress characteristic of a chemically strengthened substrate having a surface and a near-surface waveguide, comprising:
    optically coupling a measurement light into and out of the near-surface waveguide using a coupling prism, wherein the measurement light incident on the coupling prism includes a light beam generated by a light source system;
    digitally capturing a mode spectrum image of the chemically strengthened substrate using the measurement light coupled out of the near-surface waveguide through the coupling prism that travels over an optical path having a low-angle region and a high-angle region and is incident on a digital detector; and
    blocking at least a portion of light traveling in the low-angle region without substantially blocking the light traveling in the high-angle region,
    wherein the digitally captured mode spectrum has a first contrast in the absence of said blocking and has a second contrast due to said blocking, and wherein the second contrast is at least 10% greater than the first contrast, and wherein the blocking is performed using a light-blocking member, and an elevation light-blocking angle corresponding to a height of the light-blocking member is from greater than 17.4° to less than 25.3°, and the elevation light-blocking angle is measured from a tangent line tangent to the surface of the chemically strengthened substrate at a location where the optical path impinges the surface of the chemically strengthened substrate to an outer periphery of the light-blocking member further from the tangent line, and the light-blocking member extends from a location on the tangent line for the height to the outer periphery.

8. The method according to claim 7, wherein the first contrast is insufficient for determining the at least one stress characteristic and wherein the second contrast is sufficient for determining the at least one stress characteristic.

9. The method according to claim 7, wherein the at least one stress characteristic comprises at least one of a surface compressive stress and a depth of layer.

10. The method according to claim 7, wherein the light-blocking member is operably disposed optically upstream from the coupling prism used to optically couple the measurement light into the near-surface waveguide of the chemically strengthened substrate.

11. The method according to claim 10, further comprising a second light-blocking member operably disposed optically downstream from the coupling prism.

12. The method according to claim 7, wherein the chemically strengthened substrate has a thickness of less than 250 microns.

* * * * *